United States Patent
Truog et al.

(10) Patent No.: US 7,842,363 B2
(45) Date of Patent: *Nov. 30, 2010

(54) DIFFERENTIAL RELEASE SYSTEM FOR A SELF-WOUND MULTILAYER DRY PAINT DECORATIVE LAMINATE HAVING A PRESSURE SENSITIVE ADHESIVE

(75) Inventors: Keith L. Truog, Crown Point, IN (US);
Tamara L. McCartney, Stow, OH (US);
Craig W. Potter, Mentor, OH (US);
Roger A. Fahlsing, Hobart, IN (US);
Diane B. Ewanko, Mentor, OH (US)

(73) Assignee: The Procter & Gamble Company, Cincinnati, OH (US)

(*) Notice: Subject to any disclaimer, the term of this patent is extended or adjusted under 35 U.S.C. 154(b) by 269 days.

This patent is subject to a terminal disclaimer.

(21) Appl. No.: 11/638,128

(22) Filed: Dec. 12, 2006

(65) Prior Publication Data

US 2007/0092678 A1   Apr. 26, 2007

Related U.S. Application Data

(63) Continuation of application No. 10/779,534, filed on Feb. 13, 2004, now abandoned, which is a continuation-in-part of application No. 10/457,826, filed on Jun. 9, 2003, now Pat. No. 7,132,142, which is a continuation-in-part of application No. 10/367,611, filed on Feb. 14, 2003.

(51) Int. Cl.
*B32B 33/00* (2006.01)
*D06N 7/04* (2006.01)

(52) U.S. Cl. .................. 428/40.1; 428/41.5; 428/41.6; 428/42.1; 428/141; 428/904.4; 428/906

(58) Field of Classification Search .............. 428/40.1, 428/40.2, 41.5, 41.6, 41.8, 42.1, 141, 202, 428/204, 343, 352, 354, 904.4, 906
See application file for complete search history.

(56) References Cited

U.S. PATENT DOCUMENTS 1,365,715 A    1/1921   Morrison (Continued)

FOREIGN PATENT DOCUMENTS

DE    22 54 430    5/1974

(Continued)

OTHER PUBLICATIONS

All office actions for U.S. Appl. No. 11/203,847, filed Aug. 15, 2005.*

(Continued)

*Primary Examiner*—Patricia L Nordmeyer
(74) *Attorney, Agent, or Firm*—Jeffrey V Bamber

(57) ABSTRACT

A self-wound decorative dry paint transfer laminate includes a layer of dry paint, a pressure-sensitive adhesive layer on one side of the dry paint layer, and a release liner in releasable contact with the dry paint layer on a side opposite from the pressure-sensitive adhesive. The release liner has a matte release coat layer that contacts the dry paint layer. The matte release coat releasably adheres to the dry paint layer to provide a protective function but also to transfer a decorative matte finish to the dry paint layer when the release liner is removed from the dry paint layer. The opposite side of the release liner has an adhesive release coat that contacts the pressure-sensitive adhesive when the laminate is in a self-wound form.

48 Claims, 3 Drawing Sheets

U.S. PATENT DOCUMENTS

| | | |
|---|---|---|
| 2,746,893 A | 5/1956 | Matthes |
| 2,804,700 A | 9/1957 | Holtkamp et al. |
| 3,152,030 A | 10/1964 | Sampson |
| 3,301,741 A | 1/1967 | Henrickson et al. |
| 3,314,838 A | 4/1967 | Erwin |
| 3,331,729 A | 7/1967 | Danielson et al. |
| 3,616,192 A | 10/1971 | Sinclair |
| 3,640,791 A | 2/1972 | Rosenheim |
| 3,654,044 A | 4/1972 | Hirota |
| 3,666,516 A | 5/1972 | Dunning |
| 3,671,236 A | 6/1972 | Van Beusekom |
| 3,741,786 A | 6/1973 | Torrey |
| 3,743,086 A | 7/1973 | Aldrich |
| 3,896,249 A | 7/1975 | Keeling et al. |
| 3,900,644 A | 8/1975 | Sackoff et al. |
| 3,900,645 A | 8/1975 | Morgan |
| 3,916,046 A | 10/1975 | Youngberg |
| 3,933,702 A | 1/1976 | Caimi et al. |
| 4,037,008 A | 7/1977 | Tugwell |
| 4,054,697 A | 10/1977 | Reed et al. |
| 4,068,033 A | 1/1978 | Meade |
| 4,094,690 A | 6/1978 | Morton |
| 4,151,319 A | 4/1979 | Sackoff et al. |
| 4,175,156 A | 11/1979 | Ikins |
| 4,205,107 A | 5/1980 | Jaschke et al. |
| 4,210,485 A | 7/1980 | Lake |
| 4,232,077 A | 11/1980 | Meisel |
| 4,235,657 A | 11/1980 | Greenman et al. |
| 4,241,129 A | 12/1980 | Marton et al. |
| 4,248,762 A | 2/1981 | Hornibrook et al. |
| 4,248,917 A | 2/1981 | Hornibrook et al. |
| 4,256,794 A | 3/1981 | Meisel |
| 4,258,096 A | 3/1981 | LaMarche |
| 4,262,051 A | 4/1981 | Welz et al. |
| 4,298,647 A | 11/1981 | Cancio et al. |
| 4,369,157 A | 1/1983 | Conner |
| 4,376,151 A | 3/1983 | Parrotta |
| 4,376,159 A | 3/1983 | Spechler |
| 4,377,050 A | 3/1983 | Renholts |
| 4,451,522 A | 5/1984 | de Vroom |
| 4,499,130 A | 2/1985 | Questel et al. |
| 4,514,457 A | 4/1985 | Sasaki |
| 4,517,044 A | 5/1985 | Arnold |
| 4,524,097 A | 6/1985 | Graham |
| 4,550,683 A | 11/1985 | Jones |
| 4,555,441 A | 11/1985 | Rothenberg |
| 4,555,471 A | 11/1985 | Barzynski et al. |
| 4,556,595 A | 12/1985 | Ochi |
| 4,560,587 A | 12/1985 | Sasaki |
| 4,564,406 A | 1/1986 | Binks |
| 4,598,020 A | 7/1986 | Panush |
| 4,650,704 A | 3/1987 | Rothenberg |
| 4,661,182 A | 4/1987 | Lerner |
| 4,737,225 A | 4/1988 | Waugh et al. |
| 4,759,441 A | 7/1988 | Leurck |
| 4,783,354 A | 11/1988 | Fagan |
| 4,786,537 A | 11/1988 | Sasaki |
| 4,818,589 A | 4/1989 | Johnson et al. |
| 4,854,610 A | 8/1989 | Kwiatek |
| 4,871,618 A | 10/1989 | Kinneberg et al. |
| 4,888,244 A | 12/1989 | Masubuchi et al. |
| 4,894,274 A | 1/1990 | Graham et al. |
| 4,902,557 A | 2/1990 | Rohrbacher |
| 4,919,994 A | 4/1990 | Incremona et al. |
| 4,999,076 A | 3/1991 | Incremona et al. |
| 5,000,810 A | 3/1991 | Silverstein |
| 5,034,269 A | 7/1991 | Wheeler |
| 5,045,569 A | 9/1991 | Delgado |
| 5,073,457 A | 12/1991 | Blackwell |
| 5,075,149 A | 12/1991 | Owens et al. |
| 5,084,317 A | 1/1992 | Epple |
| 5,114,514 A | 5/1992 | Landis |
| 5,134,012 A | 7/1992 | Arakawa et al. |
| 5,135,798 A | 8/1992 | Muschter et al. |
| 5,141,584 A | 8/1992 | Schuh et al. |
| 5,141,790 A | 8/1992 | Calhoun et al. |
| 5,169,474 A | 12/1992 | Binder |
| 5,183,696 A | 2/1993 | Sanderson |
| 5,192,612 A | 3/1993 | Otter et al. |
| 5,196,246 A | 3/1993 | Kauss et al. |
| 5,198,301 A | 3/1993 | Hager et al. |
| 5,203,941 A | 4/1993 | Spain et al. |
| 5,215,826 A | 6/1993 | Shimanski et al. |
| 5,229,207 A | 7/1993 | Paquette et al. |
| 5,250,336 A | 10/1993 | Greuse et al. |
| 5,266,372 A | 11/1993 | Arakawa et al. |
| 5,308,694 A | 5/1994 | Andersson |
| 5,316,843 A | 5/1994 | Kiryu et al. |
| 5,322,708 A | 6/1994 | Eissele |
| 5,342,666 A | 8/1994 | Ellison et al. |
| 5,346,766 A | 9/1994 | Otter et al. |
| 5,413,829 A | 5/1995 | Brown et al. |
| 5,430,904 A | 7/1995 | Ono et al. |
| 5,441,784 A | 8/1995 | Smith |
| 5,451,440 A | 9/1995 | Tynan, Jr. |
| 5,460,855 A | 10/1995 | Andersson |
| 5,468,532 A | 11/1995 | Ho et al. |
| 5,476,901 A | 12/1995 | Smith et al. |
| 5,482,182 A | 1/1996 | Thompson et al. |
| 5,487,929 A | 1/1996 | Rusincovitch, Jr. et al. |
| 5,489,359 A | 2/1996 | Yamane |
| 5,490,893 A | 2/1996 | Enlow et al. |
| 5,498,305 A | 3/1996 | Mailloux |
| 5,506,031 A | 4/1996 | Spain et al. |
| 5,518,786 A | 5/1996 | Johnson et al. |
| 5,523,129 A | 6/1996 | McGeehan-Hatch |
| 5,571,557 A | 11/1996 | De Bastiani et al. |
| 5,573,865 A | 11/1996 | Steelman et al. |
| 5,591,290 A | 1/1997 | Walter et al. |
| 5,591,513 A | 1/1997 | Mahling |
| 5,595,626 A | 1/1997 | Yokouchi et al. |
| 5,620,772 A | 4/1997 | Taniguchi |
| 5,633,078 A | 5/1997 | Kamiyama |
| 5,633,225 A | 5/1997 | Fredj et al. |
| 5,639,539 A | 6/1997 | DeProspero et al. |
| 5,641,835 A | 6/1997 | Smith et al. |
| 5,643,668 A | 7/1997 | Calhoun et al. |
| 5,658,646 A | 8/1997 | Takano et al. |
| 5,662,977 A | 9/1997 | Spain et al. |
| 5,665,458 A | 9/1997 | Mahn, Jr. |
| 5,670,014 A | 9/1997 | Mendelovich et al. |
| 5,676,787 A | 10/1997 | Rusincovitch et al. |
| 5,681,631 A | 10/1997 | Steelman et al. |
| 5,683,805 A | 11/1997 | Oita et al. |
| 5,707,482 A | 1/1998 | Fusselman |
| 5,707,697 A | 1/1998 | Spain et al. |
| 5,725,712 A | 3/1998 | Spain et al. |
| 5,728,469 A | 3/1998 | Mann et al. |
| 5,741,620 A | 4/1998 | Holmes et al. |
| 5,750,234 A | 5/1998 | Johnson et al. |
| 5,750,254 A | 5/1998 | Starkey |
| 5,773,112 A | 6/1998 | Tachikawa et al. |
| 5,785,790 A | 7/1998 | Olsen et al. |
| 5,788,796 A | 8/1998 | Look et al. |
| 5,795,636 A | 8/1998 | Keller et al. |
| 5,814,402 A | 9/1998 | Smith |
| 5,851,931 A | 12/1998 | DeRenzo et al. |
| 5,852,121 A | 12/1998 | Steelman et al. |
| 5,853,876 A | 12/1998 | Takano et al. |
| 5,866,220 A | 2/1999 | Rusincovitch et al. |
| 5,891,294 A | 4/1999 | Shih et al. |
| 5,897,742 A | 4/1999 | Semmler |
| 5,904,968 A | 5/1999 | Langan |
| 5,906,883 A | 5/1999 | Blanc-Brude |

| | | | |
|---|---|---|---|
| 5,916,643 A | 6/1999 | Spain et al. |
| 5,919,537 A | 7/1999 | Niazy |
| 5,939,479 A | 8/1999 | Reaves et al. |
| 5,985,079 A | 11/1999 | Ellison |
| 5,989,707 A | 11/1999 | Takizawa et al. |
| 6,020,062 A | 2/2000 | Questel et al. |
| 6,042,678 A | 3/2000 | Johnson |
| 6,083,616 A | 7/2000 | Dressler |
| 6,086,995 A | 7/2000 | Smith |
| 6,096,396 A | 8/2000 | Patton et al. |
| 6,129,965 A | 10/2000 | Langan |
| 6,153,283 A | 11/2000 | Pierson et al. |
| 6,193,918 B1 | 2/2001 | McGuir et al. |
| 6,194,064 B1 | 2/2001 | Keely et al. |
| 6,214,453 B1 | 4/2001 | Kano |
| 6,214,485 B1 | 4/2001 | Barnett et al. |
| 6,221,198 B1 | 4/2001 | Gryska et al. |
| 6,221,485 B1 | 4/2001 | Sanchez et al. |
| 6,228,486 B1 | 5/2001 | Kittel et al. |
| 6,235,363 B1 | 5/2001 | Bilodeau |
| 6,248,427 B1 | 6/2001 | Ast |
| 6,296,732 B1 | 10/2001 | Enlow et al. |
| 6,311,399 B1 | 11/2001 | Steelman et al. |
| 6,312,777 B1 | 11/2001 | Smith |
| 6,322,874 B1 | 11/2001 | Steelman et al. |
| 6,324,811 B1 | 12/2001 | Gauss et al. |
| 6,336,988 B1 | 1/2002 | Enlow et al. |
| 6,349,754 B1 | 2/2002 | Johnson |
| 6,352,769 B1 | 3/2002 | Mori |
| 6,364,992 B1 | 4/2002 | Nambu et al. |
| 6,376,058 B1 | 4/2002 | Schut et al. |
| 6,379,791 B1 | 4/2002 | Cernohous et al. |
| 6,383,613 B1 | 5/2002 | Takeda |
| 6,394,165 B1 | 5/2002 | Rader |
| 6,399,193 B1 | 6/2002 | Ellison |
| 6,413,630 B1 | 7/2002 | Nakayama |
| 6,421,052 B1 | 7/2002 | McGuire |
| 6,432,241 B1 | 8/2002 | Congard et al. |
| 6,432,528 B1 | 8/2002 | Faust et al. |
| 6,447,630 B1 | 9/2002 | Disano et al. |
| 6,461,422 B1 | 10/2002 | Yang et al. |
| 6,474,389 B1 | 11/2002 | Steelman et al. |
| 6,475,616 B1 | 11/2002 | Dietz et al. |
| 6,482,488 B1 | 11/2002 | Janssen et al. |
| 6,482,638 B1 | 11/2002 | Patil et al. |
| 6,493,918 B1 | 12/2002 | Bell et al. |
| 6,509,075 B1 | 1/2003 | McCurry et al. |
| 6,514,624 B2 | 2/2003 | Takemoto |
| 6,520,234 B1 | 2/2003 | Anderson et al. |
| 6,521,337 B2 | 2/2003 | Yanagiuchi |
| 6,541,109 B1 | 4/2003 | Kumar et al. |
| 6,554,044 B2 | 4/2003 | Paulson et al. |
| 6,576,327 B1 | 6/2003 | Weissmann et al. |
| 6,579,601 B2 | 6/2003 | Kollaja et al. |
| 6,613,181 B2 | 9/2003 | Steelman et al. |
| 6,613,411 B2 | 9/2003 | Kollaja et al. |
| 6,617,008 B1 | 9/2003 | Kono et al. |
| 6,630,049 B2 | 10/2003 | Hannington et al. |
| 6,645,328 B2 | 11/2003 | Anderson et al. |
| 6,649,003 B1 | 11/2003 | Spain et al. |
| 6,649,682 B1 | 11/2003 | Breton et al. |
| 6,703,089 B2 | 3/2004 | DeProspero et al. |
| 6,706,131 B2 | 3/2004 | Steelman et al. |
| 6,709,723 B2 | 3/2004 | Roys et al. |
| 6,723,427 B1 | 4/2004 | Johnson et al. |
| 6,740,379 B1 | 5/2004 | Congard et al. |
| 6,756,095 B2 | 6/2004 | Sandt et al. |
| 6,773,653 B2 | 8/2004 | Miller et al. |
| 6,783,816 B2 | 8/2004 | Golub et al. |
| 6,805,048 B2 | 10/2004 | Pearson et al. |
| 6,808,586 B1 | 10/2004 | Steinhardt |
| 6,824,638 B1 | 11/2004 | Anderson et al. |
| 6,866,383 B2 | 3/2005 | Naik et al. |
| 6,872,268 B2 | 3/2005 | David et al. |
| 6,875,800 B2 | 4/2005 | Vanier et al. |
| 6,916,532 B2 | 7/2005 | Yanagiuchi |
| 6,929,846 B2 | 8/2005 | Kamiyama |
| 6,955,124 B2 | 10/2005 | Ciaramitaro et al. |
| 6,984,429 B2 | 1/2006 | Thunhorst et al. |
| 7,132,142 B2 | 11/2006 | Truog et al. |
| 7,141,133 B2 | 11/2006 | Kesti et al. |
| 2001/0006714 A1 | 7/2001 | Bull et al. |
| 2002/0127361 A1 | 9/2002 | Sandt et al. |
| 2002/0142155 A1 | 10/2002 | Steinberg |
| 2002/0182955 A1 | 12/2002 | Weglewski et al. |
| 2002/0197398 A1 | 12/2002 | Scholz et al. |
| 2003/0026932 A1 | 2/2003 | Johnson et al. |
| 2003/0116265 A1 | 6/2003 | Anderson et al. |
| 2003/0134114 A1 | 7/2003 | Pallotta et al. |
| 2003/0150547 A1 | 8/2003 | Kesti et al. |
| 2003/0157287 A1 | 8/2003 | Song |
| 2003/0211334 A1 | 11/2003 | Jones |
| 2004/0076788 A1 | 4/2004 | Steinhardt et al. |
| 2004/0101647 A1 | 5/2004 | Pitzen |
| 2004/0126529 A1 | 7/2004 | Squier et al. |
| 2004/0159969 A1 | 8/2004 | Truog et al. |
| 2004/0161564 A1 | 8/2004 | Truog |
| 2004/0161566 A1 | 8/2004 | Truog et al. |
| 2004/0161567 A1 | 8/2004 | Truog et al. |
| 2004/0161568 A1 | 8/2004 | Truog et al. |
| 2004/0170855 A1 | 9/2004 | Kawabata |
| 2004/0200564 A1 | 10/2004 | Kinsey et al. |
| 2004/0247837 A1 | 12/2004 | Enlow et al. |
| 2004/0253421 A1 | 12/2004 | Truog et al. |
| 2004/0253422 A1 | 12/2004 | Truog et al. |
| 2004/0253423 A1 | 12/2004 | Truog et al. |
| 2005/0003129 A1 | 1/2005 | Truog et al. |
| 2005/0092420 A1 | 5/2005 | Kinne et al. |
| 2005/0175818 A1 | 8/2005 | Kawabata et al. |
| 2005/0196607 A1 | 9/2005 | Shih et al. |
| 2005/0255271 A1 | 11/2005 | Brimo |
| 2006/0003114 A1 | 1/2006 | Enlow et al. |
| 2006/0029765 A1 | 2/2006 | Truog et al. |
| 2006/0046027 A1 | 3/2006 | Kaminski et al. |
| 2006/0046028 A1 | 3/2006 | Kaminski et al. |
| 2006/0046083 A1 | 3/2006 | Steinhardt et al. |
| 2006/0051571 A1 | 3/2006 | Steinhardt et al. |
| 2006/0073318 A1 | 4/2006 | Tuttle et al. |
| 2006/0088695 A1 | 4/2006 | Coburn |
| 2006/0093776 A1 | 5/2006 | Crum |
| 2006/0165979 A1 | 7/2006 | Kinsey et al. |
| 2007/0092679 A1 | 4/2007 | Truog et al. |
| 2007/0098943 A1 | 5/2007 | Truog et al. |

FOREIGN PATENT DOCUMENTS

| | | |
|---|---|---|
| DE | 35 43 777 A1 | 6/1987 |
| DE | 197 35 958 A1 | 2/1999 |
| DE | 198 37 774 A1 | 2/2000 |
| EP | 0 032 258 A1 | 7/1981 |
| EP | 0 103 344 B1 | 3/1984 |
| EP | 0 103 407 A1 | 3/1984 |
| EP | 0 216 230 A2 | 4/1987 |
| EP | 0 233 633 B1 | 8/1987 |
| EP | 0 238 301 A1 | 9/1987 |
| EP | 0 266 224 B1 | 5/1988 |
| EP | 0 381 349 B1 | 8/1990 |
| EP | 0 384 252 B1 | 8/1990 |
| EP | 0 395 814 A2 | 11/1990 |
| EP | 0 473 254 B1 | 3/1992 |
| EP | 0 480 892 A1 | 4/1992 |
| EP | 0 487 724 B1 | 6/1992 |
| EP | 0 561 086 A | 9/1993 |
| EP | 0 569 921 B1 | 11/1993 |
| EP | 0 578 957 B1 | 1/1994 |
| EP | 0 619 184 B1 | 10/1994 |

| | | |
|---|---|---|
| EP | 0 623 477 A2 | 11/1994 |
| EP | 0 638 019 B1 | 2/1995 |
| EP | 0 658 175 B1 | 6/1995 |
| EP | 0 695 629 A2 | 2/1996 |
| EP | 0 752 498 B1 | 1/1997 |
| EP | 0 794 522 B1 | 9/1997 |
| EP | 0 803 351 A1 | 10/1997 |
| EP | 0 893 247 A1 | 1/1999 |
| EP | 0 992 361 B1 | 4/2000 |
| EP | 0 993 876 B1 | 4/2000 |
| EP | 1 018 533 B1 | 7/2000 |
| EP | 1 023 169 B1 | 8/2000 |
| EP | 1 034 090 B1 | 9/2000 |
| EP | 1 038 665 A1 | 9/2000 |
| EP | 1 047 556 B1 | 11/2000 |
| EP | 1 053 793 B1 | 11/2000 |
| EP | 1 055 514 B1 | 11/2000 |
| EP | 1 093 911 A2 | 4/2001 |
| EP | 1 169 180 B1 | 1/2002 |
| EP | 1 201 422 B1 | 5/2002 |
| EP | 1 203 968 A1 | 5/2002 |
| EP | 1 226 958 A1 | 7/2002 |
| EP | 1 318 011 B1 | 6/2003 |
| EP | 1 342 565 B1 | 9/2003 |
| EP | 1 377 646 B1 | 1/2004 |
| EP | 1 462 423 A1 | 9/2004 |
| EP | 1 518 716 A1 | 3/2005 |
| GB | 967405 | 8/1964 |
| GB | 1 232 971 | 5/1971 |
| JP | 49039997 A | 4/1974 |
| JP | 03080557 A | 4/1991 |
| JP | 04008785 A | 1/1992 |
| JP | 05-139095 A | 8/1993 |
| JP | 08/034959 | 2/1996 |
| JP | 08058033 A | 3/1996 |
| JP | 09041617 A | 2/1997 |
| JP | 10/278187 | 10/1998 |
| JP | 11293123 | 10/1999 |
| JP | 2001227132 | 8/2001 |
| JP | 2001295425 | 10/2001 |
| JP | 2001310953 | 11/2001 |
| JP | 2002067243 | 3/2002 |
| JP | 2002113995 | 4/2002 |
| JP | 2005-206724 A | 8/2005 |
| JP | 2005-220337 A | 8/2005 |
| WO | WO 90/00788 A1 | 1/1990 |
| WO | WO 92/13712 A1 | 8/1992 |
| WO | WO 94/03337 A2 | 2/1994 |
| WO | WO 94/09983 A1 | 5/1994 |
| WO | WO 95/17312 A1 | 6/1995 |
| WO | WO 99/19149 A1 | 4/1999 |
| WO | WO 99/37479 A1 | 7/1999 |
| WO | WO 99/64235 A1 | 12/1999 |
| WO | WO 00/01527 A1 | 1/2000 |
| WO | WO 00/50234 | 8/2000 |
| WO | WO 00/56556 A1 | 9/2000 |
| WO | WO 01/00411 A1 | 1/2001 |
| WO | WO 01/79372 A2 | 10/2001 |
| WO | WO 03/053719 A2 | 7/2003 |
| WO | WO 03/062341 A2 | 7/2003 |
| WO | WO 03/066761 A2 | 8/2003 |
| WO | WO 03/095238 A1 | 11/2003 |
| WO | WO 2004/062903 A2 | 7/2004 |
| WO | WO 2004/074003 | 9/2004 |
| WO | WO 2004/074004 | 9/2004 |
| WO | WO 2004/074006 | 9/2004 |
| WO | WO 2004/074007 | 9/2004 |
| WO | WO 2004/074007 A2 | 9/2004 |
| WO | WO 2004/074008 | 9/2004 |
| WO | WO 2004/074008 A2 | 9/2004 |
| WO | WO 2004/074009 | 9/2004 |
| WO | WO 2005/007397 A1 | 1/2005 |
| WO | WO 2005/075591 A1 | 8/2005 |
| WO | WO 2005/087490 | 9/2005 |
| WO | WO 2005/087492 | 9/2005 |
| WO | WO 2005/105429 A1 | 11/2005 |
| WO | WO 2006/052698 | 5/2006 |

OTHER PUBLICATIONS

All office actions for U.S. Appl. No. 11/203,911, filed Aug. 15, 2005.*

Millikin & Company, "180 Walls", Jul. 18, 2006, Milliken & Company website www.180walls.com, home page, pages showing different patterns, and Frequently Asked Questions pages, 26 pages.

Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.

Author Unknown, Avery Dennison™ "Find a Solution" Architectural film product information from website www.averydennison.com, copyright 1996-2007, web pages printed Feb. 6, 2007, Avery Dennison Corporation, Pasadena, CA U.S.A., 15 pages.

Author Unknown, DI-NOC™ Film Planning Guide, pp. 1-32, http://solutions.3m.com/wps/portal/3M/en_US Graphics/Scotchprint/Solutions/Di-NocFilm/Bulletins/, date of publication unknown, Minnesota Mining and Manufacturing Company (3M), St. Paul, MN, U.S.A.

Author Unknown, DI-NOC™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.

Author Unknown, "Appplication of 3M™ DI-NOC™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.

Author Unknown, "Installation de DI-NOC", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.

NOPAR International, "Folio Contact: We stick to your ideas!", "Products—FolioContact—FAQ", "Data Sheet Folio Contact Gridded/Squared, imprinted for permanent markers and white for non-permanent markers", NOPAR International GmbH website, www.jet-contact.com, downloaded Mar. 19, 2007, NOPAR International GmbH, Bremen, Germany.

International Search Report and Written Opinion for PCT/US2004/004397, mailed Sep. 10, 2004.

International Preliminary Report on Patentability for PCT/US2005/039890, mailed May 18, 2007.

International Preliminary Report on Patentability for PCT/US2004/004397, date of completion of report Mar. 8, 2005.

International Search Report and Written Opinion for PCT/US2004/004398, mailed Nov. 22, 2004.

International Preliminary Report on Patentability for PCT/US2004/004398, mailed May 12, 2005.

International Search Report and Written Opinion for PCT/US2004/004386, mailed Jul. 21, 2004.

International Preliminary Report on Patentability for PCT/US2004/004386, mailed Sep. 1, 2005.

International Search Report and Written Opinion for PCT/US2004/004396, mailed Sep. 7, 2004.

International Preliminary Report on Patentability for PCT/US2004/004396, mailed Sep. 1, 2005.
Concise Explanation of Relevance of Publications That Are Not in English Language Pursuant to 37 CFR Section 1.98 (3)(i), 2 pages.
Concise Explanation of Non-English Language Publication Under 37 CFR § 1.98(3)(i), 1 page.
Co-Pending and/or Related U.S. Applications and Patents, 4 pages.
U.S. Appl. No. 11/393,506, filed Mar. 30, 2006, Kinsey et al.
U.S. Appl. No. 60/778,832, filed Mar. 3, 2006, Steinhardt et al.
U.S. Appl. No. 60/779,191, filed Mar. 3, 2006, Westendorf et al.
U.S. Appl. No. 60/778,996, filed Mar. 3, 2006, Westendorf et al.
U.S. Appl. No. 11/413,543, filed Apr. 28, 2006, Westendorf et al.
U.S. Appl. No. 11/648,452, filed Dec. 28, 2006, Truog et al.
U.S. Appl. No. 11/707,353, filed Feb. 16, 2007, Shih et al.
U.S. Appl. No. 60/848,760, filed Oct. 2, 2006, Zeik et al.
U.S. Appl. No. 60/849,052, filed Oct. 3, 2006, Zeik et al.
U.S. Appl. No. 60/848,739, filed Oct. 2, 2006, Zeik et al.
U.S. Appl. No. 60/849,053, filed Oct. 3, 2006, Zeik et al.
Office Action dated Feb. 13, 2009 for U.S. Appl. No. 10/457,791 filed on Jun. 9, 2003, first named inventor Keith L Truog.

* cited by examiner

DIFFERENTIAL RELEASE SYSTEM FOR A SELF-WOUND MULTILAYER DRY PAINT DECORATIVE LAMINATE HAVING A PRESSURE SENSITIVE ADHESIVE

CROSS-REFERENCE TO RELATED APPLICATIONS

This is a continuation of U.S. application Ser. No. 10/779,534, filed Feb. 13, 2004 now abandoned, which is a continuation-in-part of application Ser. No. 10/457,826, filed Jun. 9, 2003 now U.S. Pat. No. 7,132,142, which is a continuation-in-part of U.S. application Ser. No. 10/367,611, filed Feb. 14, 2003. These applications are incorporated herein in their entirety by this reference.

FIELD OF THE INVENTION

This invention relates generally to dry paint transfer laminates, and more particularly, to a differential release system for a self-wound decorative laminate having a pressure-sensitive adhesive layer.

BACKGROUND

Dry paint transfer laminates have been used in the past as surface coverings that provide an alternative to conventional painting. Water based paints and oil based paints have well known shortcomings that can be overcome by the use of decorative dry paint transfer films as a paint replacement. Environmental problems such as solvent evaporation from paint systems applied by spray painting also are avoided by use of decorative dry paint transfer films.

Such decorative dry paint transfer films are typically applied to a substrate surface by an adhesive layer carried by the film. Use of heat-activated adhesives or water-activated adhesives can have certain disadvantages that are overcome by use of pressure-sensitive adhesives, by which the decorative film is adhered to the substrate surface by application of pressure only, typically at room temperature. Examples of decorative films having pressure-sensitive adhesive layers for interior or exterior applications are disclosed in U.S. Pat. No. 6,096,396 to Patton et al., U.S. Pat. No. 6,086,995 to Smith, and U.S. Pat. No. 5,229,207 to Paquette et al.

Decorative films having a pressure-sensitive adhesives are often adapted to facilitate application to a surface by using various forms of repositionable adhesives known in the art. The laminate can be initially applied to a surface, removed temporarily, and then repositioned, to allow the adhesive to form a permanent bond. Decorative films having such a repositionable adhesive layer are described, for example, in the '207 patent to Paquette et al.

Such decorative films or laminates having pressure-sensitive adhesives also can be self-wound to facilitate storage of the film and application of the film to a substrate surface when the paint film is unwound. These self-wound films commonly include a release coating on a face of the decorative film opposite from the pressure-sensitive adhesive layer. The '995 patent to Smith, for example, discloses such a self-wound roll of a pressure-sensitive adhesive-coated laminate which eliminates the need to strip or discard a protective release layer as part of the application process.

SUMMARY OF THE INVENTION

Briefly, the present invention provides a self-wound decorative dry paint transfer laminate having a layer of dry paint, a pressure-sensitive adhesive layer on one side of the dry paint layer, and a release liner in releasable contact with the dry paint layer on a side opposite from the pressure-sensitive adhesive. The release liner has a dry paint release coat for transferring a controlled gloss level to the dry paint layer. In one embodiment, the release liner has a matte release coat releasably adhered to the dry paint layer. The matte release layer transfers a decorative matte or low gloss finish to the dry paint layer when the release liner is removed from the dry paint layer. The opposite side of the release liner has an adhesive release coat layer that faces away from the dry paint layer and contacts the pressure-sensitive adhesive when the laminate is wound to a rolled-up form. The adhesive release coat on the release liner provides an unwind release function that, in one embodiment, preferentially releases from the pressure-sensitive adhesive when the laminate is unwound; and then after unwinding and application of the dry paint layer to a substrate surface, the release liner can be removed from the dry paint layer. In one embodiment, the preferential release is provided by the adhesive layer having an unwind release force which is lower than a carrier release force present between the release liner's dry paint release coat and the dry paint layer.

One embodiment of the invention comprises a self-wound multilayer laminate for applying a layer of color to a surface, in which the laminate includes a dry paint layer comprising a binder and a pigment, and a pressure-sensitive adhesive layer overlying a surface of the dry paint layer. A release liner overlies an opposite surface of the dry paint layer on a side opposite from the pressure-sensitive adhesive layer. The release liner has a matte release coat layer releasably adhered to the dry paint layer and an adhesive release coat layer on a side of the release liner opposite from the dry paint layer. The matte release coat is removable from the dry paint layer at room temperature. The pressure-sensitive adhesive is adapted for adhering the laminate to a substrate surface at room temperature. The matte release coat transfers a matte finish to an exposed surface of the dry paint layer when the pressure-sensitive adhesive layer adheres the laminate to the substrate surface under application of pressure. The release liner is then peeled away from the dry paint layer. The laminate is adapted for being self-wound into a roll form with the pressure-sensitive adhesive layer in contact with the adhesive release coat layer. The adhesive release coat layer and the pressure-sensitive adhesive layer have a first mutual release force between them which is lower than a second mutual release force between the matte release coat and the dry paint layer, such that the adhesive release coat layer preferentially releases the liner from contact with the pressure-sensitive adhesive layer while the matte release coat maintains the release liner in releasable contact with the dry paint layer when the laminate is being unwound from its roll form.

The invention, in one embodiment, is characterized by its "differential release" system in which the composition of the pressure-sensitive adhesive produces a controlled level of releasability from the adhesive release coat on the release liner (unwind release force) while maintaining a controlled level of adhesion when attached to the substrate surface. The composition of the matte release coat material is controlled so that the release liner preferentially maintains adhesion contact with the dry paint layer while the adhesive layer of the self-wound laminate is unwound from contact with the release liner; but the composition of the matte release coat also is controlled so it can release from contact with the dry paint layer while the adhesive layer maintains its contact with the substrate surface. The matte release coat material also is controlled to transfer a desired low gloss micro-roughened surface to the dry paint layer. In addition, the composition of the dry paint layer is controlled in relation to the matte release coat to maintain the carrier release force at the desired level, above the unwind release force (over a range of release rates typically experienced during use). In addition to its contact with the matte release coat, the dry paint layer, and more particularly, the transparent outer clear coat material, is controlled to also maintain desired levels of abrasion resistance, repaintability, and other mechanical and optical properties.

These and other aspects of the invention will be more fully understood by referring to the following detailed description and the accompanying drawings.

DETAILED DESCRIPTION

Figure 1:
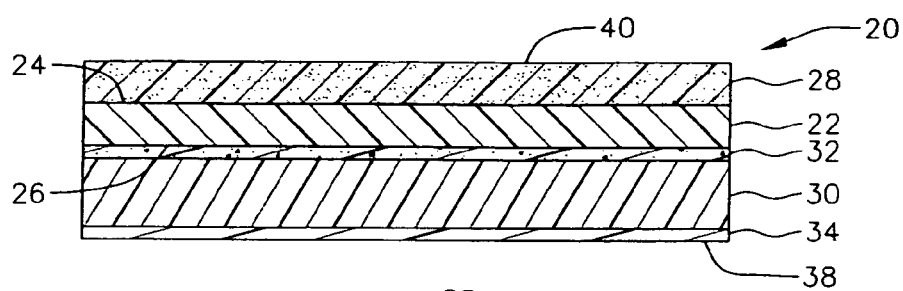
FIG. 1 is a schematic cross-sectional view illustrating one embodiment of a multi-layer dry paint transfer laminate according to principles of this invention.

Referring to FIG. 1, a multilayer dry paint transfer laminate 20 is adapted for use as a surfacing film. The multilayer laminate includes a pigmented dry paint layer 22 comprising a synthetic resinous binder containing a dispersed pigment. The dry pigmented paint layer 22, also referred to herein as a color layer, generally can be a monocoat pigmented layer as illustrated in FIG. 1, or it can be combined with additional pigmented paint layers, coatings or print coats described below. In each instance, these decorative elements of the multilayer dry paint transfer film will be referred to generally as a decorative dry paint layer. In the illustrated FIG. 1 embodiment, the dry paint layer 22 has an upper surface 24 and a lower surface 26. The multilayer laminate further includes a dry adhesive layer 28 overlying and adhered to the upper surface 24 of the dry paint layer, and a flexible and foldable release liner 30 overlying and releasably adhered to the lower surface of the dry paint layer. The release liner has a dry paint release coat for controlling the gloss level of the dry paint layer. In one embodiment, the release liner has a matte release coat 32 on its inner surface for releasably adhering the release liner 30 to the lower surface 26 of the dry paint layer 22. The release liner 30 is adapted to be peeled away from the dry paint layer under an applied release force, also referred to herein as a carrier release function. The matte release coat 32 separates from the dry paint layer 22 but remains adhered to the release liner 30 when the release liner is peeled away from the dry paint layer. The release liner 30 also has an adhesive release coat layer 34 on a surface opposite from the dry paint layer. An exposed outer surface 38 of the adhesive release coat layer 34 is adapted for releasably contacting an exposed outer surface 40 of the adhesive layer 28 when the laminate is wound in a roll form illustrated in FIG. 2.

Figure 2:
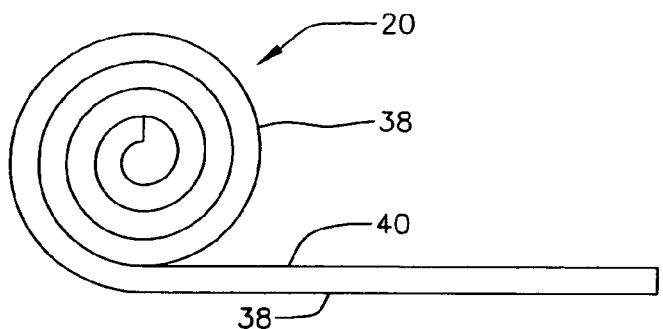
FIG. 2 is a schematic illustration of the dry paint transfer laminate self-wound into a roll form.

Referring to FIG. 2, the dry paint transfer laminate 20 is self-wound into a roll form with the outer exposed surface 38 of the adhesive release coat layer 34 in releasable contact with the exposed outer surface 40 of the adhesive layer 28. Thus, when the dry paint transfer laminate 20 illustrated in FIG. 2 is unwound, the adhesive release coat layer 34 on the release liner separates from the outer surface 40 of the adhesive layer 28 and remains adhered to the release liner 30. The matte release coat 32 remains adhered to the dry paint layer.

Figure 3:
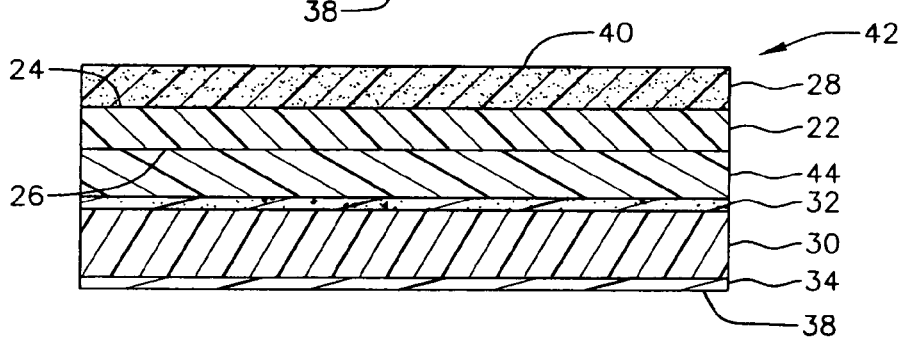
FIG. 3 is a schematic cross-sectional view showing an alternative embodiment of a dry paint layer contained in the laminate.

FIG. 3 illustrates a dry paint transfer laminate 42 which is identical to the dry paint transfer laminate 20 illustrated in FIG. 1, except that the decorative dry paint layer includes an optically transparent synthetic resinous clear coat layer 44 adhered to the lower surface 26 of the pigmented dry paint layer 22. In this embodiment, the outer clear coat layer 44 is in releasable contact with the matte release coat 32 of the release liner 30. When the release liner 30 is peeled away from the clear coat layer 44, the matte release coat 32 separates from the clear coat layer 44 and remains adhered to the release liner 30.

Figure 4:
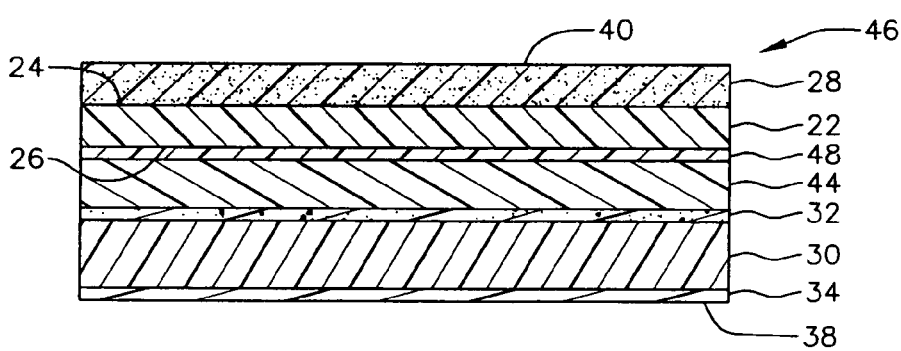
FIG. 4 is a schematic cross-sectional view showing another alternative embodiment of the dry paint layer.

FIG. 4 illustrates a multilayer dry paint transfer laminate 46 which is identical to the dry paint transfer laminate 42 illustrated at FIG. 3, except that the decorative dry paint layer further includes a decorative print coat layer 48 between the pigmented dry paint layer 22 and the clear coat layer 44. The decorative print coat layer provides a decorative print pattern, and the pigmented dry paint layer 22 provides a background color and opacity for the decorative dry paint layer. The print pattern and background color are visible through the outer clear coat layer 44.

Figure 5:
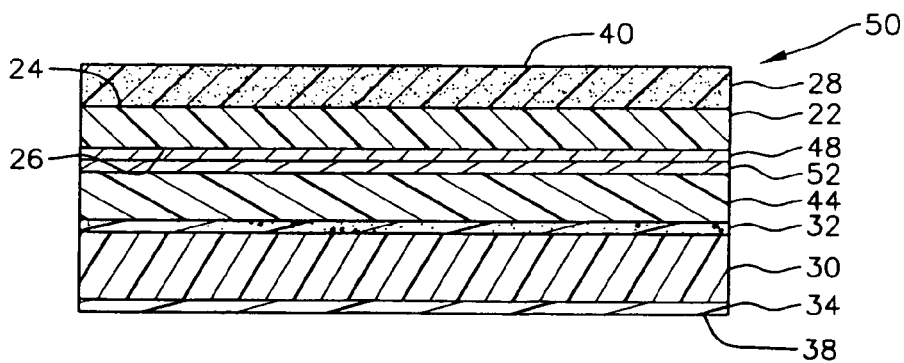
FIG. 5 is a schematic cross-sectional view illustrating an alternative embodiment of the dry paint layer of FIG. 4.

FIG. 5 illustrates a multilayer dry paint transfer laminate 50 which is identical to the dry paint transfer laminate 46 illustrated in FIG. 4, except that a second decorative print coat layer 52 can be printed or coated between the print coat layer 48 and the outer clear coat layer 44.

Additional print coat layers may be used. For instance, the multilayer laminate may contain up to about five or more print coats, and in one embodiment, preferably three or four print coat layers are used. The layers may have a print or design pattern using conventional printing methods, such as gravure, flexography, silk screen, or ink jet printing.

Figure 6:
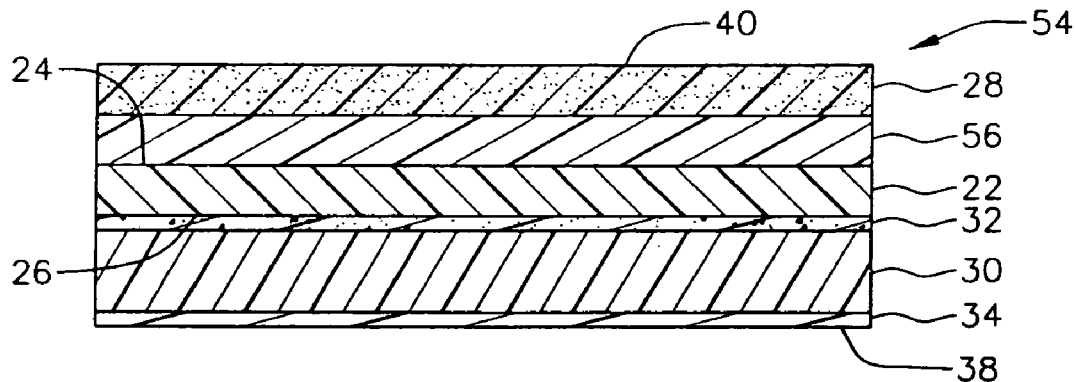
FIG. 6 is a schematic cross-sectional view illustrating an embodiment containing a support layer.

FIG. 6 illustrates an embodiment of a multilayer dry paint transfer laminate 54 which is identical to the multilayer laminate 20 illustrated in FIG. 1, except that the laminate 54 includes a flexible reinforcing layer 56 (also referred to herein as a support layer) between the dry paint layer 22 and the adhesive layer 28. The reinforcing layer 56 provides a means of structural support for the decorative dry paint layer and can provide additional opacity for the decorative dry paint layer. The reinforcing layer has a tensile strength which exceeds that of the dry paint layer or layers.

Figure 7:
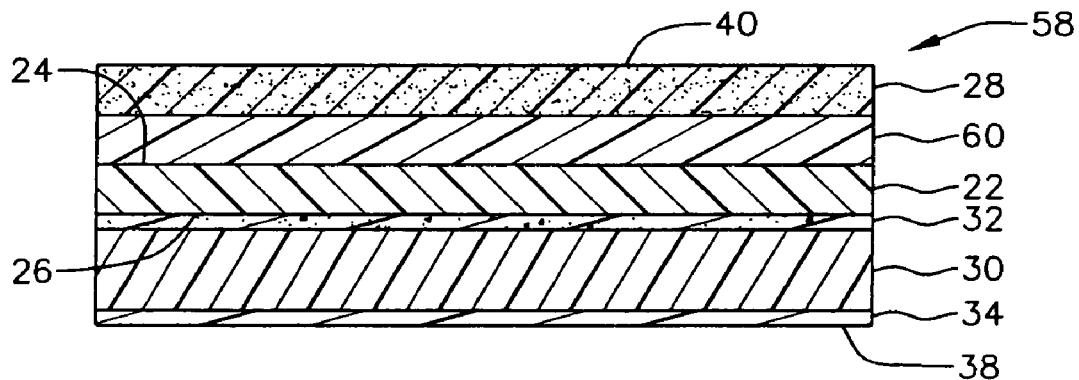
FIG. 7 is a schematic cross-sectional view illustrating an embodiment containing a barrier layer.

FIG. 7 illustrates another embodiment of the dry paint transfer laminate 58 which is identical to the laminate 20 illustrated in FIG. 1, except that the laminate 58 includes a flexible barrier layer 60 between the pigmented dry paint layer 22 and the adhesive layer 28. The intervening barrier layer can be used to inhibit or prevent undesired migration of constituents between the adhesive layer and the paint coat layer. Such barrier properties can include reducing or avoiding undesired discoloration by inhibiting or preventing migration of pigments from an underlying substrate surface through the adhesive layer to the dry paint layer.

The embodiment of FIGS. 6 and 7 show separate support (reinforcing) and barrier layers. In addition, the barrier layer 60 may be included as a layer in the FIG. 6 embodiment. In this instance, the barrier layer may be applied between the dry paint layer and the support (reinforcing) layer, or the barrier layer may be applied between the adhesive layer and the support layer.

The dry paint layer 22 may have a thickness generally of about 0.5 to about 1.5 mils, in one embodiment about 0.5 to about 1.2 mils, and in another embodiment from about 0.5 to about 0.9 mil. The thickness of the adhesive layer may range generally from about 0.4 to about one mil, in one embodiment from about 0.4 to about 0.8 mil, and in another embodiment from about 0.4 to about 0.6 mil. The thickness of the release liner may range generally from about 0.5 to about 2 mils, in one embodiment from about 0.5 to about 1.5 mils, and in another embodiment from about 0.85 to about 1.05 mils. The thickness of the matte release coat layer may range generally from about 0.05. to about 0.3 mil, and in one embodiment from about 0.1 to about 0.2 mil. The thickness of the adhesive release coat layer may range from about 0.04 to about 0.2 mil, in one embodiment from about 0.04 to about 0.15 mil, and in another embodiment from about 0.04 to about 0.08 mil. The thickness of the outer clear coat layer may range generally from about 0.05 to from about 0.4 mil, and in one embodiment from about 0.05 to about 0.3 mil.

The thickness of the decorative print coat layers may range from about 0.02 to about 0.15 mil, and in one embodiment from about 0.02 to about 0.08 mils.

The reinforcing layer may have a thickness generally of about 0.3 to about 1.4 mils. In one embodiment the thickness can be about 0.3 to about 1.1 mils, in another embodiment about 0.3 to about 0.8 mil, and in a further embodiment about 0.3 to about 0.5 mil. When the reinforcing layer is used, the overall thickness of the combination of the dry paint layer and the support layer may be in the range of about 0.5 to about 1.5 mils, in another embodiment about 0.5 to about 1.2 mils, and in a further embodiment from about 0.5 to about 0.9 mil.

The barrier layer may have a thickness in the range of about 0.01 to about 0.1 mil, and in one embodiment about 0.05 to about 0.1 mil, and in another embodiment from about 0.01 to about 0.02 mil.

Each of the foregoing thicknesses are dry film thicknesses. The laminates may have any width or length that is suitable for its end use. For example, the width may range from about one to about 200 cm, and in one embodiment from 10 to 100 cm, and in another embodiment from about 30 to about 40 cm. The length may range from about 10 to about 6500 meters, and in one embodiment from about 15 to about 1000 meters. The laminates may take the form of flat sheets or as a self-wound roll form as illustrated in FIG. 2.

Dry Paint Layer

The dry paint layers may comprise independently one or more polymeric binders or resins, and one or more pigments. The reinforcing layer and barrier layer may comprise one or more polymeric binders or resins, and optionally one or more pigments. The transparent outer clear coat layer may comprise one or more polymeric binders or resins. These layers may be made from solvent cast liquid coating or paint compositions comprising the one or more binders or resins and one or more pigments (if used). These compositions may be dispersed in water or one or more organic solvents, and optionally may contain one or more additional additives for controlling properties such as Theological properties or barrier properties. The dry paint layers, or the transparent outer clear coat layer, or the reinforcing layer or barrier layer may each comprise independently one or more extruded layers.

The binder or resin may comprise any binder or resin conventionally used in coating or paint formulations. The binder may comprise a thermoplastic or thermosetting resin. The binder or resin may be a synthetic resin or a natural resin. The binder or resin may comprise a film forming material which may be cast as a solvent-based coating or in one embodiment may be an extrudable film forming material. Examples of useful binders or resins generally include acrylic, vinyl, polyester, alkyd, butadiene, styrene, urethane and epoxy resins and phthalic acid or anhydride resins, and mixtures thereof. More specifically, the binder or resin may include one or more polystyrenes, polyolefins, polyamides, polyesters, polycarbonates, polyvinyl chloride, polyvinyl alcohol, polyethylene vinyl alcohol, polyurethanes, polyacrylates, polyvinyl acetates, ionomer resins, and mixtures thereof.

The binder or resin may comprise vinyl and vinylidene polymers or copolymers containing units such as vinyl acetate, vinyl chloride, and vinylidene chloride; hydrocarbon polymers and copolymers containing ethylene or propylene units and oxygenated or halogenated derivatives of ether, butadiene, oxygenated butadiene, isoprene, oxygenated isoprene, butadiene-styrene, butadiene vinyl toluene, and isoprene-styrene; polymers or copolymers containing units of acrylic acid, methacrylic acid, their esters, or acrylonitrile; vinylic hydrocarbon monomers reacted with unsaturated materials such as the reaction product of maleic acid or anhydride with styrene; and, broadly, various other resinous rubber-like elastomeric latex polymers and copolymers of ethylenically unsaturated monomers and polymers obtainable in stable aqueous latex form. The binder or resin may comprise a copolymer of vinyl chloride and vinyl acetate.

The polyolefins may be characterized as having a melt index or melt flow rate of less than about 30, and in one embodiment less than about 20, and in one embodiment less than about 10 as determined by ASTM Test Method 1238. The polyolefins include polymers and copolymers of ethylene, propylene, 1-butene, etc., or blends of mixtures of such polymers and copolymers.

Various polyethylenes may be used including low, medium, and high density polyethylenes. The low density range for the polyethylenes may be from about 0.910 to about 0.925 $g/cm^3$, the medium density range may be from about 0.925 to about 0.940 $g/cm^3$, and the high density range may be from about 0.940 to about 0.965 $g/cm^3$. An example of a useful low density polyethylene is Rexene 1017 available from Huntsman.

The propylene homopolymers which may be used either alone or in combination with a propylene copolymer include a variety of propylene homopolymers such as those having melt flow rates from about 0.5 to about 20 as determined by ASTM Test D 1238, condition L.

The polyamide resins include resins available from EMS American Grilon Inc., Sumter, S.C. under the general tradename Grivory such as CF-65, CR-9, XE-3303 and G-21. The polyamide resins also include those available from, for example, Union Camp of Wayne, N.J. under the Uni-Rez product line, and dimer-based polyamide resins available from Bostik, Emery, Fuller, and Henkel (under the Versamid product line).

The polystyrenes include homopolymers as well as copolymers of styrene and substituted styrene such as alphamethyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc.

The polyurethanes include aliphatic as well as aromatic polyurethanes.

The polyesters may be prepared from various glycols or polyols and one or more aliphatic or aromatic carboxylic acids. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from DuPont is Selar PT-8307 which is polyethylene terephthalate.

Acrylate polymers and copolymers and alkylene vinyl acetate resins (e.g., EVA polymers) may be used. Examples include Escorene UL-7520 (Exxon), a copolymer of ethylene with 19.3% vinyl acetate; Nucrell 699 (DuPont), an ethylene copolymer containing 11% of methacrylic acid, etc.

Ionomer resins (polyolefins containing ionic bonding of molecular chains) may be used. Examples of ionomers include ionomeric ethylene copolymers such as Surlyn 1706 (DuPont) and Surlyn 1702 from DuPont.

Polycarbonates also are useful, and these are available from the Dow Chemical Co. (Calibre) G.E. Plastics (Lexan) and Bayer (Makrolon).

The pigment may be any pigment used in making decorative coatings. These include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalocyanine blue, ultramarine blue, cadmium pigments, and chromium pigments. The pigments include organic reds such as azo reds, quinacridone red and perylene red as well as organic yellows such as diarylide yellow. Mixed metal oxide pigments may be used. Filler pigments such as clay, silica, talc, mica, woloastonite wood flour, barium sulfate, calcium carbonate, aluminum silicate, and the like can be added as well in conventional amounts traditionally used in coating and paint formulations.

The solvent may be an organic-based solvent, such as a ketone, ester, aliphatic compound, aromatic compound, alcohol, glycol, glycol ether, etc. These include methylethyl ketone, methylisobutyl ketone, ethyl acetate, white spirits, alkanes, cycloalkanes, benzene, hydrocarbon substituted aromatic compounds (e.g., toluene, the xylenes, etc.), isoparaffinic solvents, and combinations of two or more thereof. Alternatively, water or a water-based solution may be used to form an aqueous emulsion with the binder or resin. Water-based solutions include water-alcohol mixtures. The solvent or water is sufficiently volatile so that when applied to a substrate, the solvent evaporates leaving behind the binder or resin, pigment (if used), and any other additional non-volatile components.

Additional ingredients that may be used include wetting agents; plasticizers; suspension aids; thixotropic agents such as silica; water repellant additives such as polysiloxane compounds; fire retardant additives; biocides; defoamers; and flow agents.

The pigment concentration for the liquid paint or coating composition used to form the dry paint layers may range from about 10 to about 30% by weight, and in one embodiment about 13 to about 27% by weight. The binder or resin concentration may range from about 20 to about 40% by weight, and in one embodiment about 22 to about 37% by weight. The water or organic solvent concentration may range from about 30 to about 70% by weight, and in one embodiment about 40 to about 60% by weight. The additional ingredients such as wetting agents, suspension agents, etc., may have concentrations up to about 5% by weight. The coating or paint compositions used in making the dry paint layers may have a pigment to binder volume concentration in the range of about 5 to about 35%, and in one embodiment 10 to about 30%.

The liquid paint or coating compositions used for making the dry paint layers may be blended using known techniques. The dry paint layer may comprise a single coat or multiple coats of paint and is in the form of a continuous layer, while the printed decorative layers may independently be in the form of continuous or discontinuous layers. When multiple coats for the dry paint layer are used, each coat may have the same or a different formulation. The print coats may have the same color or a different color than the dry paint layer, or the print coats may have the same color, or they may have colors that are different from each other. The dry paint layer may be used to provide background color while the print layers may be used to provide a desired pattern or design.

(a) Transparent Top Coat Layer

The transparent outer clear coat layer may comprise a single coating layer or multiple coats, and may comprise any of the resinous materials described above. When multiple coats are used, each coat may have the same or a different formulation. As mentioned previously, the outer clear coat layer may be solvent cast (aqueous or organic solvent based) or the outer clear coat layer may be extruded. The outer clear coat layer, in one embodiment, provides enhanced scuff resistance, stain resistance and/or recoatability to the dry paint film layer or layers underlying it. Enhanced recoatability facilitates the subsequent application of another dry paint film layer or printed decorative layer over it, or the application of conventional paint or decorative dry paint films.

(b) Reinforcing or Support Layer

The reinforcing or support layer may be formed from any of the binder or resin materials described above. This layer may be formed from a solution or an emulsion and applied using any of the coating techniques described below. This layer also may be extruded. The reinforcing layer may contain one or more of the above-described pigments to enhance opacity of the finished laminate. The concentration of pigment in the reinforcing layer, when used, may range up to about 10% by weight, and in one embodiment about 6 to about 10% by weight.

The dry paint layers, outer clear coat layer or reinforcing layer independently may contain inorganic fillers or other organic or inorganic additives to provide desired properties such as appearance properties (clear, opaque or colored films), durability and processing characteristics. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, and acid acceptors.

One or more of the dry paint layers, outer clear coat layer or reinforcing layer may contain a minor amount of an adhesive resin to enhance the adhesion of the dry paint layer to the outer clear coat layer and/or the support layer. Also, or alternatively, tie coat layers of an adhesive resin can be used between the dry paint layers and either the outer clear coat layer or the reinforcing layer. The adhesive resin for the tie coat can be an acrylic resin adhesive, or it can be an ethylene/vinyl acetate copolymer adhesive such as those available from DuPont under the tradename Elvax. The adhesive resins available from DuPont under the tradename Bynel also may be used.

In one embodiment, the dry paint layers, the outer clear coat layer and/or the reinforcing layer are flexible, but non-stretchable and non-elastic at room temperature.

Adhesive Layer

The dry adhesive layer may comprise a pressure-sensitive adhesive (PSA) which bonds the decorative laminate to a substrate surface, under applied pressure, at room temperature. The adhesive layer may be a continuous or discontinuous layer, and it may comprise one or a mixture of two or more adhesives. The adhesive layer may be a patterned adhesive layer with relatively strong adhesive tack level in some areas and a relatively weak adhesive in other areas.

In one embodiment, the adhesive layer is a repositionable adhesive, having a low initial tack that allows slight movement of the laminate to allow positioning adjustments prior to forming a permanent bond. In one embodiment, the adhesive has a suppressed initial level of tack at room temperature that allows the laminate to adhere to a substrate surface and be repositioned thereon followed by removal of the matte release liner from the decorative dry paint layer. The adhesive layer undergoes a subsequent buildup of adhesion due to the passage of time sufficient to permanently bond the dry paint layer to the substrate. In one embodiment, the adhesive layer is characterized by producing only a limited amount of ooze beyond the borders of the laminate when the laminate is applied to a substrate. In one embodiment, no ooze is produced.

In one embodiment of the invention described below, the pressure-sensitive adhesive comprises a crosslinked acrylic resinous material, and more particularly, a crosslinked acrylic emulsion. A particularly useful adhesive material comprises an internally crosslinked acrylic emulsion. These pressure-sensitive adhesive materials provide a useful combination of low tack, peel and flow properties with a sufficient level of cohesive strength at a useful (thin) coat weight for providing the differential release properties described below. High molecular weight acrylic adhesives and externally crosslinked acrylic adhesives also may be used to produce the desired combination of functional properties.

The adhesive may comprise a rubber based adhesive, acrylic adhesive, vinyl ether adhesive, silicone adhesive, or mixture of two or more thereof. The adhesive may be applied to the laminate as a hot melt, solvent-based or water based adhesive. The adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; or poly (vinyl ether). Other materials may be included in the adhesive such as tackifying resins, plasticizers, antioxidants, fillers, and waxes.

A description of useful pressure-sensitive adhesives may be found in *Encyclopedia of Polymer Science and Engineering*, Vol. 13. Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Pressure-sensitive adhesives that may be used include the hot melt pressure-sensitive adhesives available from H.B. Fuller Company, St. Paul, Minn. as HM-1597, HL-2207-X, HL-2115-X, HL-2193-X. Other useful pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wisconsin. In addition, rubber based block copolymer PSAs described in U.S. Pat. No. 3,239,478 to Harlan also can be used. This patent is incorporated by reference for its disclosure of such hot melt adhesives.

The adhesive compositions may contain at least one solid tackifier resin component. A solid tackifier is defined herein as one having a softening point above 80° C. When the solid tackifier resin component is present, the adhesive compositions may comprise from about 40% to about 80% by weight of a thermoplastic elastomer component, in one embodiment from about 20% to about 60% by weight, and in another embodiment from about 55% to about 65% by weight of a solid tackifier resin component. The solid tackifier reduces the modulus of the mixture sufficiently to build tack or adhesion. Also, solid tackifiers (particularly the higher molecular weight solid tackifiers (e.g., Mw greater than about 2000) and those having a lower dispersity (Mw/Mn=less than about 3) may be less sensitive to migration into the polymer film layer. This is desirable since migration of tackifier into the film layer may cause dimensional instability.

The solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, petroleum hydrocarbons resins such as the resins sold under the trademark Escorez by Exxon Chemical Company, or Wingtack 95, a synthetic tackifier resin available from Goodyear, Akron, Ohio.

The modulus of adhesive mixtures to be coextruded also may be lowered by the incorporation of liquid rubbers, i.e., liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which are coextrudable with the polymeric film materials. The incorporation of a liquid rubber may produce an adhesive having increased tack and adhesion. Liquid block copolymers such as liquid styrene-isoprene block copolymers may be used. Other liquid rubbers which may be incorporated into the adhesive mixture include liquid styrene-butadiene rubbers, liquid butadiene rubbers, ethylene-propylene rubbers, etc.

The adhesive layer also may contain one or more pigments to enhance the opacity of the paint film layers overlying it and permit use of thinner paint film layers to achieve desired levels of opacity. Any of the pigments identified above may be used. Examples include titanium dioxide and carbon black. The pigment volume concentration may range up to about 10%, in one embodiment from about 5% to about 10%, and in another embodiment from about 2% to about 8%.

The adhesive compositions also may include other materials such as antioxidants, heat and light stabilizers, ultraviolet light absorbers, fillers, colorants, antiblocking agents, reinforcing agents, and processing aids.

The adhesive compositions may contain inorganic fillers and other organic and inorganic additives to provide desired properties. Examples of useful fillers include calcium carbonate, titanium dioxide, metal particles, and fibers.

Barrier Layer

The barrier layer may comprise any of the acrylate polymers or copolymers described above, polyvinyl alcohol, copolymers derived from ethylene and vinyl acetate, and copolymers derived from ethylene, vinyl acetate and polyvinyl alcohol. In one embodiment, the barrier layer may comprise a polymer blend of polyvinyl alcohol to urethane, available from Avecia Resins. The barrier layer can inhibit or reduce the migration of dyes or pigments and other materials into the dry paint layer from the substrate to which the laminate is applied.

Examples of barrier layers are described in U.S. application Ser. No. 457,826 identified above and incorporated herein by reference.

Matte Release Liner

The release liner has a dry paint release coat bonded to the liner for transferring a surface finish of a controlled gloss level to the dry paint layer. The surface of the release liner or a coating on the release liner can transfer a high gloss, semi-gloss or matte (flat) surface finish to the dry paint layer. In one embodiment, the release liner has a matte release coat with a micro-roughened surface for transferring a matte surface finish to the dry paint layer, either to its transparent layer or to its color layer or print layer.

The release liner may independently comprise paper, polymer film, or a combination thereof. The release liner, in one embodiment, is thermally stable, non-elastomeric and non-stretchable at room temperature.

Although paper of any weight may be used as a release liner, paper having weights in the range of from about 30 to about 120 pounds per ream are useful, and papers having weights in the range of from about 60 to about 100 pounds per ream are preferred. The term "ream" as used herein equals 3000 square feet.

Alternatively, the release liner may independently comprise a polymeric film, and examples of polymeric films include polyolefin, polyester, and combinations thereof. The release liner preferably may be formed from a flexible, foldable, heat-resistant, substantially inelastic, self-supporting temporary carrier film or casting sheet as is known in the art of dry paint transfer films. The release liner is preferably an oriented polyester film such as polyethylene terephthalate (PET) available as Mylar, a trademark of DuPont, or Hoechst Celanese Hostaphan 2000 polyester film, for example.

The release liner provides structural integrity to the laminate until the liner is removed upon application of the laminate to a substrate surface.

The matte release coat layer may comprise any of the above identified binders or resins which provide a level of tack or adherence between the release coat layer and the decorative dry paint layer, which may comprise either the color coat layer, the outer clear coat layer, or the decorative print layer. The tack level of the matte release coat layer is sufficient to prevent separation of the release coat layer from the adhered dry paint layer during the process of forming the dry paint transfer laminate and during normal handling of the laminate, including forming it in its self-wound orientation, unwinding it, and applying it to the substrate surface. The matte release coat also continues to have sufficient release properties to facilitate separation between the release coat layer and the adhered dry paint layer after having applied the laminate to the substrate.

The matte release coat formulation comprises a coating which can be applied to the release liner by conventional casting techniques such as gravine printing. The preferred coating composition is a thermosetting resinous material which, when exposed to heat for drying it, also crosslinks and permanently bonds as a surface film adhered to the release liner. The solids contained in the matte release coat preferably include, as a principal component, one or more crosslinking agents to provide good adhesion of the dried crosslinked coating to a polyester carrier film. In one embodiment, the matte release coat formulation includes a primary crosslinking resin such as a melamine resin that controls crosslinking and produces adhesion to the polyester carrier film. A presently preferred crosslinking resin is hexamethoxy methyl resin such as Cymel 303. A suitable primary functional resin is a vinyl resin such as a medium molecular weight vinyl chloride-vinyl acetate resin known as VAGH. The vinyl resin can be present in an amount up to about 20% of the total solids in the matte release coat. In addition, the matte release coat can include a secondary functional resin to improve release of the top surface of the decorative dry paint layer from the matte release coat. In one embodiment, the secondary functional resin can be an acrylic-modified alkyd resin such as the resin known as Chempol 13 1501 or Lankyd 13-1245. This secondary functional resin comprises from about one percent to about 16% of the total solids, by weight, of the matte release coat. The matte release coat further includes a suitable catalyst for accelerating the crosslinking process, typically comprising from about one percent to about eight percent of the total solids in the matte release coat, by weight.

The resinous components of the matte release coat composition are combined with suitable solvents. In one embodiment, the resins are mixed with a primary resin solvent such as methyl isobutyl ketone (MIBK) which comprises from about 65% to about 85% of the total solvent in the formulation. A secondary resin solvent, such as isopropyl alcohol (IPOH), is useful in retarding crosslinking of resins in solution. The secondary resin solvent preferably comprises from about 5% to about 20% of the total solvent.

The matte release coat formulation is prepared by dissolving the primary functional resin in the primary and secondary resin solvents by mixing and then adding the secondary functional resin together with a primary matting agent, preferably in the form of a filler comprising a fine particulate inert inorganic material. In one embodiment, the filler comprises aluminum silicate with an average particle size of about 4.8 microns. In another embodiment, the filler can comprise talc. The filler contained in the formulation comprises up to about 50% of the total solids in the matte release coat. In one embodiment, the talc filler material comprises from about 40% to about 50% of the total solids contained in the matte release coat. The fine particulate filler is thoroughly dispersed in the resin and resin solvent blend, preferably under elevated temperatures from about 100° F. to about 120° F.

In use, when the matte release layer dries and crosslinks, it forms a chemical matte coating on the surface of the carrier sheet. The matte surface is controlled by the amount and particle size of the filler. The fine particles project through the dried exterior surface of the matte release coat to form, on a microscopic scale, a surface with a microroughness that transfers a replicated microroughness to the exposed surface of the dried outer clear coat or dry paint layer. This produces light scattering, resulting in a flat or low surface gloss matte finish on the top surface of the decorative dry paint layer.

In one embodiment a matte release coat formulation useful for this invention contains no significant amount of a silicone-based release material and/or a wax-based component. Such materials may be useful in providing release properties at high temperatures; but the matte release coat of this invention, in one embodiment, comprises a formulation that, in the absence of a silicone-based release material or a wax-based component, provides a useful combination of room temperature release, adherence of the release liner to the dry paint layer, and transfer of the matte surface to the exposed surface of the dry paint layer. Stated another way, the matte release coat has a hardened state at room temperature and is made from a resinous material that contains (1) a surfacing component that forms a matte release surface, (2) an adhesion component for releasably adhering the matte release surface to the dry paint layer, and (3) a release component that releases the matte release surface from contact with the dry paint layer at room temperature to transfer the matte surface finish from the matte release surface to the exposed surface of the dry paint layer.

In one embodiment, the matte release coat comprises, on a solids basis, from about 10% to about 30% by weight alkyd resin; from about 10% to about 30% by weight vinyl resin; from about 20% to about 35% by weight melamine crosslinking resin; and from about 5% to about 10% catalyst. The balance of the solids comprises the fine particulate filler, e.g. talc, as described previously.

In one embodiment, the weight ratio of particulates to resin or binder may range up to about 1.1:1, in one embodiment from about 0.7:1 to about 1.1:1, in another embodiment from about 0.7:1 to about 0.9:1, and in a further embodiment from about 0.9:1 to about 1.1:1.

The gloss transferred to the outer surface of the dry paint layer can be controlled by a combination of release coat formulations and the composition of the outer surface layer of dry paint in contact with the release coat. In one embodiment, an 85° gloss of less than about 10 gloss units can be transferred to dry paint films having a monocoat or base coat/clear coat finish comprised of urethane, acrylic and/or vinyl resinous paint layers. The preferred release coat comprises an acrylic/vinyl blend containing a micro-particle filler. In another embodiment, 85° gloss measurements of less than about 35 gloss units can be transferred to dry paint films having a monocoat or base coat/clear coat finish comprised of urethane, acrylic and/or vinyl resinous paint layers. The preferred release coat comprises an acrylic modified alkyd resin and/or vinyl resins containing dispersed microparticles.

The carrier film or release liner is typically contained on a supply roll from which the carrier is unwound and passed to a gravure print station where the matte release coat is coated onto the release liner. The release liner containing the matte release coat is then passed through a drying oven operated at a temperature from about 325° F. to about 350° F., sufficient for drying and crosslinking the matte release coat. In the first stage drying oven, the matte release coat is sufficiently crosslinked to permanently bond it to the carrier sheet. Preferably, the matte release coat is coated and dried to a coat weight (dry) from about 3 to about 6 gsm.

The adhesive release coat layer may comprise any release coating composition known in the art. Silicone release coating compositions may be used. The silicone release coating compositions typically comprise polyorganosiloxanes such as polydimethylsiloxanes. The silicone release coating composition used in this invention may be room temperature cured, thermally cured, or radiation cured. Generally, the room temperature and thermally curable compositions comprise at least one polyorganosiloxane and at least one catalyst (or curing agent) for such polyorganosiloxane(s). These compositions may also contain at least one cure accelerator and/or adhesivity promoter.

Each of the layers in the multi-layer laminate may be independently applied and dried and/or cured using known techniques. The application techniques include gravure, reverse gravure, offset gravure, roll coating, brushing, knife-over roll, metering rod, reverse roll coating, doctor knife, dipping, die coating, slot die coating, spraying, curtain coating, slide coating, slide curtain coating, extrusion, co-extrusion, flexographic, letter press, rotary screen, and flat screen. In one embodiment, the pressure sensitive adhesive layer may be applied using transfer lamination. The decorative print layers may be applied using known printing techniques including gravure, flexographic, silk screen, and ink jet printing. The applied layers may be dried and/or cured by exposure to heat or to known forms of ionizing or actinic non-ionizing radiation. Drying or curing temperatures that may be used may range from about 115° C. to about 160° C., and in one embodiment about 140° C. to about 150° C. Useful types of radiation include ultraviolet light and electron beam. The equipment for generating these forms of thermal or radiation drying and/or curing are well known to those skilled in the art.

Figure 8:
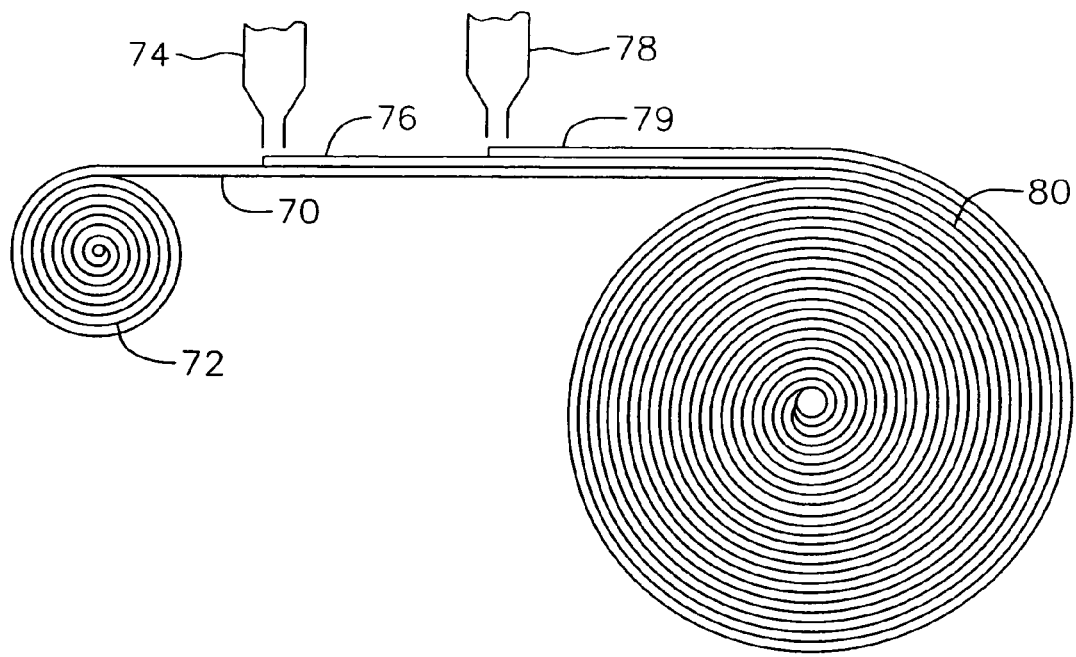
FIG. 8 is a schematic illustration of a process for co-extruding a support layer and an adhesive layer used in one embodiment of the invention.
Figure 9:
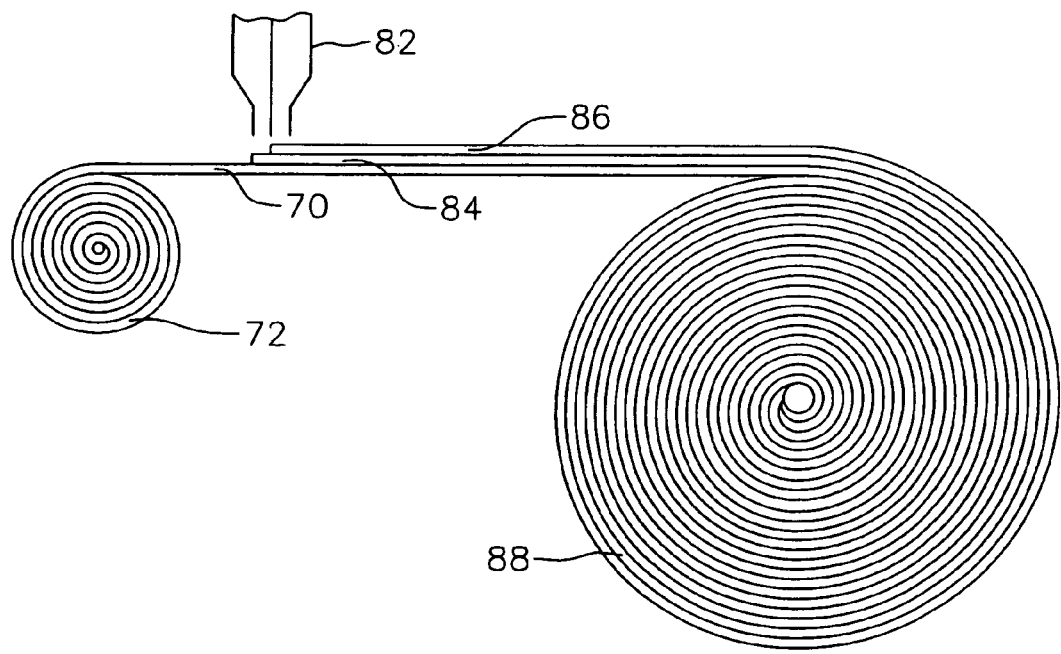
FIG. 9 is a schematic illustration of a process for co-extruding a support layer and an adhesive layer used in another embodiment of the invention.

Various layers of the multi-layer laminate also can be formed by extrusion and coextrusion techniques identified above and described in more detail in U.S. application Ser. No. 457,826 identified above and incorporated herein by reference. The dry paint layer or the support layer may be coextruded with the adhesive layer using separate extruders as illustrated in FIG. 8 or a dual die extruder as illustrated in FIG. 9. Referring to FIG. 8, release liner 70 is uncoiled from a roll 72 and advanced past an extrusion die 74 where it is coated with an adhesive layer 76, and then past an extrusion die 78 where a reinforcing or support layer 79 is coated onto the adhesive layer 76. The resulting coextrudate is collected on a take-up roll 80. Referring to FIG. 9, the release liner 70 is advanced past a dual extrusion die 82 which simultaneously coats the release liner 70 with a coextruded adhesive layer 84 and support layer 86. The resulting coextrudate is collected on a take-up roll 88.

The dry paint transfer laminate illustrated in FIG. 1 may be made by applying the adhesive release coat to the lower surface of the release liner using one of the foregoing application techniques and then curing the release coat. The coat weight for the adhesive release coat layer may be in the range from about 0.1 to about one gram per square meter (gsm), and in one embodiment from about 0.25 to about 0.35 gsm. The matte release coat layer is then applied to the upper surface of release liner using one of the above described application techniques (e.g., gravure) and then dried or cured. The coat weight for the matte release coat may be in the range from about 2.5 to about 6.5 gsm, and in one embodiment, from about 4.5 to about 5.5 gsm. The liquid paint or coating composition for forming the pigmented dry paint layer is then applied to the surface of the matte release coat layer using one of the above described application techniques (e.g., reverse roll or slot die) and then dried or cured. The coat weight for the pigmented dry paint layer may range from about 20 to about 60 gsm, and in one embodiment about 30 to about 40 gsm. One or more coats may be applied. The pressure-sensitive adhesive layer is then applied to the upper surface of dry paint layer using one of the above indicated application techniques (e.g., slot die) and then dried or cured. The pressure sensitive adhesive may be applied using coating techniques or transfer lamination. The coat weight for the pressure sensitive adhesive layer may range from about 10 to about 30 gsm, and in one embodiment about 11 to about 17 gsm. The dry paint transfer laminate 20 may then be wound into roll form as illustrated in FIG. 2.

The dry paint transfer laminate illustrated in FIG. 3 may be made using the same procedure as the laminate 20 of FIG. 1, except that the transparent outer clear coat layer is applied to the matte release coat layer and then dried or cured prior to application of the pigmented dry paint film layer. The dry paint layer is then applied to the surface of the clear coat layer. The clear coat layer may be applied using one of the foregoing application techniques (e.g., gravure). The coat weight for the clear coat layer may range from about one to about 5 gsm, and in one embodiment about 2.5 to about 3.5 gsm. One or more coats may be applied. The dry paint transfer laminate may then be wound into a roll as illustrated in FIG. 2.

The dry paint transfer laminate illustrated in FIG. 4 may be made using the same procedure used as the laminate 20, except that the liquid paint composition for forming the printed decorative layer is applied to the surface of the transparent film layer and then cured prior to application of the dry paint film layer. The dry paint film layer is then applied to the surface of the printed decorative layer. The printed decorative layer may be applied using any of the foregoing printing techniques (e.g., gravure, flexographic, silk screen, or ink jet). The coat weight for the printed decorative layer may range from about 0.3 to about 2 gsm, and in one embodiment about 0.3 to about 0.7 gsm. The dry paint transfer laminate may then be wound into a roll as illustrated in FIG. 2.

The dry paint transfer laminate illustrated in FIG. 5 may be made using the same procedure as the laminate of FIG. 4, except that the liquid paint composition for forming the second printed decorative layer is applied to the surface of the transparent film layer and then dried or cured prior to the application of the first printed decorative layer. The second printed decorative layer may be applied using any of the foregoing printing techniques (e.g., gravure, flexographic, silk screen, ink jet). The coat weight for the second printed decorative layer may range from about 0.3 to about 2 gsm, and in one embodiment about 0.3 to about 0.7 gsm. The dry paint transfer laminate may then be wound into a roll as illustrated in FIG. 2.

The dry paint transfer laminate illustrated in FIG. 6 may be made using the same procedure used for making the laminate 20 illustrated in FIG. 1, except that the reinforcing layer is adhered to the dry paint layer. The reinforcing layer may be coextruded with the adhesive layer and then the dry paint film layer may be coated (e.g., gravure) onto the reinforcing layer. The dry paint transfer laminate may then be wound into a roll as illustrated in FIG. 2.

The dry paint transfer laminate illustrated in FIG. 7 may be made using the same procedure used for making the laminate 20 illustrated in FIG. 1, except that the barrier layer is coated on the dry paint transfer layer. The dry paint transfer laminate may then be wound into a roll as illustrated in FIG. 2.

The dry paint transfer laminate may be made in a single production line or in multiple production lines or multiple production facilities. With multiple production lines or facilities, part of the laminate may be produced as a roll laminate, dried or cured, rolled up, transferred to the next production line or facility, unrolled, and further treated with the application of additional layers. For example, the dry paint layer and the adhesive layer may be formed in multiple lines, or they may be formed in sequence in a single production line, or they may be simultaneously formed such as by coextrusion or multi-die coating methods.

The dry paint transfer laminate 20 may be used by unrolling the laminate from the roll illustrated in FIG. 2, and simultaneously applying the laminate to the substrate surface to be covered. The substrate may comprise any flat surface. The flat surface may comprise wall board, plastic sheet, metal sheet, composites, and the like. The substrate may comprise an interior (i.e., indoor) surface or an exterior (i.e., outdoor) surface. The laminate may be applied to a painted surface having various surface finishes, from flat, semi-gloss to glossy. The laminate is placed over the substrate with the adhesive layer in contact with the substrate. Pressure is applied, with repositioning if necessary, until the laminate is adhered to the surface. The release liner is then peeled off the front face of the decorative laminate, leaving the dry paint film layer adhered to the substrate by the adhesive layer. The dry paint transfer laminates shown in FIGS. 3 through 7 and in FIG. 10 also may be applied to a substrate surface in the same manner as the laminate 20.

Differential Release System

In one embodiment of the invention, the release properties of the laminate are controlled so that, in the embodiments illustrated in FIGS. 1-7 and FIG. 10, the release force required to separate the matte release coat layer from the dry paint layer (which may comprise the transparent layer, the color layer, or printed decorative layer) is greater than the release force required to separate the adhesive release coat layer from the pressure-sensitive adhesive layer.

In one embodiment, the carrier release force required to separate the matte release coat layer from the dry paint layer (i.e., the color layer, the clear coat layer, or the printed decorative layer) may be generally in the range from about 20 to about 180 grams per two inches (g/2 in), in one embodiment from 30 to about 150 g/2 in, and in another embodiment 40 to about 120 g/2 in. In other embodiments the release force range may be from 50 to about 100 g/2 in, from 50 to about 90 g/2 in, from about 70 to about 90 g/2 in, and from about 50 to about 65 g/2 in.

In one embodiment, the unwind release force required to separate the adhesive release coat layer from the pressure-sensitive adhesive layer is generally in the range from about 10 to about 150 g/2 in, in one embodiment from about 20 to about 150 g/2 in, in another embodiment about 20 to about 90 g/2 in, and in other embodiments from about 30 to about 150 g/2 in, about 30 to about 100 g/2 in, and about 30 to about 70 g/2 in.

The test method for determining these release forces involves measuring the force required to separate a two-inch wide release coated liner from the dry paint layer or from an adhesive coated substrate, with the release coated liner extending at an angle of 90° relative to the layer or substrate and being pulled at a rate of 300 inches per minute. The test is conducted at room temperature.

According to one embodiment of the invention, the decorative film contains a differential release system which enables the film to be unrolled from its self-wound form with the release liner maintaining continuous contact with the dry paint layer. As the decorative film is unrolled, the silicone-coated outer surface of the release liner preferentially releases from contact with the PSA side of the film while the matte release coat side of the release liner maintains constant contact with the dry paint layer. This contact of the release liner with the dry paint layer is maintained throughout unwinding, application to the substrate surface, and any repositioning of the decorative film on the surface, until the release liner is ready to be peeled away from the decorative paint layer. The differential release system is adapted to maintain such preferential contact between the release liner and the dry paint layer because the dry paint layer is non-self-supporting, i.e., it has no structural integrity in and of itself, and therefore relies upon its contact with the release liner to provide the necessary structural support during unrolling, handling and repositioning, for example.

As mentioned previously, the release force between the release liner and the matte release layer (carrier release force) exceeds the release force between the silicone-coated side of the releaser liner and the PSA (unwind release force). Tests have shown that this "force differential" is dependent upon the rate or speed at which the materials at each interface are peeled away from each other. Inasmuch as the self-wound film, in use, may be unwound at different speeds, an objective of the differential release system is to ensure that the carrier release force exceeds the unwind release force over a wide range of release rates that are normally encountered during use. Generally speaking, this force differential is maintained over a wide range of speeds. During use, slow rates are encountered when unwinding a new roll or during the initial start of a roll on the surface. Medium to fast rates are encountered when the strip continues down the surface. In one embodiment, the force differential is maintained for a range of speeds up to about 300 inches per minute for a 2 inch wide strip. In another embodiment, this force differential is maintained up to a speed of at least 600 inches per minute for a 2 inch wide strip.

The force needed to remove the PSA from the silicone side of the liner also should be less than the force needed to peel the carrier off the dry paint side in order to prevent peeling the carrier during slitting or unwinding, in addition to avoiding peeling of the carrier during unrolling, application to a surface, and repositioning on the surface. Unwind speeds in excess of 600 inches per minute may be encountered when cutting the film to individual roll sizes, but tests have shown that, in one embodiment, at such high speeds an undesired unwind response is not produced even when unwind release forces exceed carrier release force.

Such differential release forces can be measured, as described previously, by separating the liner from the matte release layer or the PSA layer in a two-inch wide strip at an angle of 90° pulled at a rate of 300 inches per minute with the tests conducted at room temperature. In one embodiment, the carrier release force is maintained higher than the unwind release force for release rates from about 6 inches per minute up to at least about 300 inches per minute. In another embodiment, the carrier release force is maintained within a range from about 45 to about 65 grams/2 inches over a wide range of release rates from about 6 inches per minute up to at least about 300 inches per minute. A corresponding unwind release force is maintained within a range from about 20 to about 40 grams/2 inches, over a range of liner release rates from about 12 to about 60 inches per minute.

Tests have shown that carrier release forces are maintained at a relatively uniform level across a wide range of release rates, whereas unwind release forces tend to increase as release rates increase and can eventually exceed the carrier release forces above certain higher release rate levels. However, tests have shown that for release rates above about 300 inches per minute, an unwind release force in excess of the carrier release force does not negatively impact premature release of the release liner from the matte release layer during normal use conditions of the self-wound decorative film.

The composition of the PSA is coordinated with the composition of the dry paint layer in order to produce the desired differential release properties. The particular formulation used for the PSA can affect unwind release response. In addition, the composition of the dry paint layer which comes into contact with the matte release layer can affect release properties. In one embodiment, a relatively low unwind release force can be desirable if the carrier release force is relatively higher. However, there are limitations on the absolute magnitude of the carrier release force. Producing a substantially higher carrier release force compared to the lower unwind release force can maintain desired contact between the carrier and dry paint film during unwinding and application to a substrate surface; but if the carrier release force is too high, there may be difficulties in producing a proper release of the release liner from the dry paint layer after the PSA side of the laminate has been affixed to the substrate surface. If the carrier release force is too high, the user may experience difficulty in initially peeling the liner from the paint film; or removing the release liner may overcome the bond between the dry paint layer and the substrate and result in peeling the dry paint layer from the surface.

Therefore, another objective of the invention is to produce a differential release system in which the carrier release force is higher than the unwind release force over a broad range of release rates, but the carrier release force level is maintained below a certain maximum force level. In one embodiment, a preferred dry paint layer comprises a transparent outer clear coat layer as described in Examples 7 and 9, in which the outer layer comprises a solvent-cast acrylic resinous material. This top coat material provides benefits of abrasion and stain resistance and repaintability in the finished film in addition to a useful carrier release force level when the matte release liner is peeled from the outer layer. The composition of the matte release coat in this embodiment comprises the alkyd/vinyl/melamine resinous composition of Examples 7 or 9, and the composition of the PSA comprises the adhesive formulation of Examples 7 or 9. In this embodiment, the carrier release force when peeled from the acrylic-based paint layer is maintained within a range of about 45 to about 65 grams per 2 inches. Corresponding unwind release force is maintained within a range of about 20 to about 40 grams per 2 inches, over a range of liner release rates from about 12 to at least about 60 inches per minute. It has been observed that the lower carrier release force level associated with the acrylic-based outer clear coat layer, i.e., below about 65 grams per 2 inches, provides sufficiently low carrier release properties to enable users to easily remove the release liner over a wide range of use conditions and carrier release rates.

By lowering the unwind release force response, the carrier release force then can be lowered to a more desirable level as mentioned previously. The PSA used in the present invention is preferably an internally crosslinked pressure-sensitive adhesive which lowers peel and tack levels. In one embodiment, the internally crosslinked acrylate-based copolymer emulsion PSA of Example 9, for instance, produces unwind release levels that are sufficiently low to allow use of matte release coatings that produce carrier release responses at the more desirable lower levels as described previously. Use of a non-crosslinked (or lightly crosslinked) pressure-sensitive adhesive, which is softer, can have undesirable edge ooze characteristics during use; but in addition, it can produce higher peel and tack levels that undesirably increase the unwind release force in a direction toward the carrier release force.

The matte release coat composition also can control the carrier release force level. In the matte release coat formulation of Examples 7 and 9, the melamine crosslinking agent can be used to control the carrier release force level. The content of the alkyd resin and the lower molecular weight vinyl resin also can be controlled to lower release force. A useful combination of these components can produce desired room temperature adhesion to the release liner and release force response when peeling the release liner from the dry paint layer surface. The release coat composition also controls uniformity of and gloss level of the transferred matte surface.

As mentioned, the tack or peel level of the PSA also is controlled with respect to the surface to which the laminate is affixed. That is, the PSA in its dry form must have a low unwind release force from the silicone-coated release liner but also must have a sufficient level of tack to properly adhere to a substrate surface as well as providing sufficient repositionability.

A pressure sensitive adhesive useful for this invention is characterized by relatively low tack and peel force levels and relatively low room temperature flow properties. Such adhesives, if they are too soft, can undesirably increase unwind force and can adversely affect repositioning of the paint film. Acrylic emulsion PSAs are particularly useful when such PSAs have a level of crosslinking that produces an adhesive material with a relatively high cohesive strength that yields a desirable combination of low tack, peel and flow properties. Examples of useful PSAs in which the level of crosslinking can be appropriately adjusted include acrylic emulsion PSAs such as pure polymer (butyl acrylate or 2-ethyl hexyl acrylate or 2-ethyl hexyl acrylate/butyl acrylate) PSAs or similar pigmented polymer and copolymer materials.

A particularly useful PSA for this invention is an internally crosslinked acrylic emulsion PSA such as a non-tackified crosslinked copolymer emulsion of butyl acrylate and 2-ethyl hexyl acrylate. This particular adhesive contains a crosslinking agent which controls the level of crosslinking and produces a desirable combination of low tack, peel and flow and relatively high cohesive strength at a useful low coat weight. This adhesive is available from Avery Dennison Corporation as product no. S-3506, or in its pigmented form as product no. S-3526.

Other multi-functional acrylic-based polymer and copolymer materials can be used to produce similar adhesive properties in their crosslinked form. In addition, other suitable pressure-sensitive adhesives for this invention can comprise high molecular weight acrylic emulsion adhesives. Such high molecular weight adhesives can behave in a manner similar to the crosslinked adhesives in producing low tack, peel and flow characteristics at sufficiently high cohesive strength. Exterior crosslinking agents also can be used to provide the desired level of crosslinking in such pressure sensitive adhesives materials.

Another useful adhesive is a high molecular weight crosslinked acrylic emulsion adhesive (butyl acrylate/2-ethyl hexyl acrylate) available from Avery Dennison as product no. S-3000.

As mentioned previously, the PSA useful for this invention can be characterized, in part, as an adhesive that produces an unwind release force which is lower than the carrier release force, when releasing from contact with a silicone-coated release liner. The PSA also can be characterized, in part, by its level of adhesion to a substrate such as flat paint, glossy paint, primed drywall or stainless steel, for example. In one embodiment, the PSA formulation can be controlled to produce a low level of tack characterized by a looptack value within the range of about 0.8 to about 2.4 lbs/in, in which the adhesive is measured for adhesion to stainless steel and laminated to a 2 mil PET facestock, at a standard coat weight of 15 gsm.

In another embodiment, the PSA formulation can be controlled to produce a low level of 90° peel force adhesion, characterized by 15 minute peel adhesion to stainless steel in the range of 0.80 to 1.5 lbs/in for 2 mil PET; or 15 minute peel adhesion to flat painted surfaces of 0.05 to 0.30 lbs/in, or 15 minute peel adhesion to glossy painted surfaces of 0.20 to 0.40 lbs/in in which the adhesive is laminated to the dry paint transfer film with the release liner carrier.

In another embodiment, the PSA can be adjusted to produce a low peel force characterized by 90° peel adhesion values at 24 hours as follows: dry wall—0.30 to 0.50 lbs/in; flat paint—0.40 to 0.65 lbs/in; and glossy paint—0.60 to 0.90 lbs/in.

The PSA also can be characterized by its desired low flow properties at room temperature. Such characteristics can be measured by its WPI (plasticity) value which in one embodiment has a WPI value from about 3.2 to about 3.8 mm.

The desired PSA also has a sufficient level of cohesive strength that enables the adhesive to permanently bond the paint film to the wall in the absence of a high level of tack. The level of crosslinking can effect such a cohesive strength, and in one embodiment, the cohesive strength is measured by a shear value of greater than 1,000 minutes (500 g ¼ sq. in., 20 minute dwell, 14-16 gsm coat weight direct coated on 2 mil PET dried at 120° C. for 5 minutes).

EXAMPLES 1 and 2

A polyethylene terephthalate (PET) release liner is coated on one side with a silicone release coating corresponding to the adhesive release coating layer. The thickness of the release coated liner is 0.92 mil, also known as Mitsubishi 92 gauge SLK.

A matte release coat is applied to the other side of the release liner using gravure at a coat weight of 6.5-7.75 gsm. The formulation for the matte release coat is as follows: 26 parts by weight methylisobutyl ketone, 6 parts by weight isopropanol, 34.8 parts by weight Lankyd 13-1425 (a product supplied by Akzo Resins identified as an acrylic modified alkyd), 2.6 parts by weight Elvacite 2042 (a product supplied by Lucite International identified as a polyethyl methacrylate polymer), 30 parts by weight Microtalc MP 15-38 (a product supplied by Barretts Minerals identified as a talc extender pigment), 2.5 parts by weight Cycat 4040 (a product supplied by Cytec identified as paratoluene sulfonic acid), and 8.7 parts by weight Cymel 303 (a product supplied by Cytec identified as a melamine resin). The matte release coat is dried using forced hot air at a temperature of 149° C. which crosslinks the resin and bonds the matte silicone coat to the polyester carrier. The talc particles project from the surface of the dried matte release coat to form a microroughened surface.

A transparent clear coat layer is applied to the matte release coat using gravure at a coat weight of 2.7-2.9 gsm and dried using forced hot air at a temperature of 120° C. The formulation for the clear coat layer is as follows: 46.7% by weight methyl ethyl ketone, 31.3% by weight toluene, 11% by weight VYNS (a product of Union Carbide identified as a vinyl chloride/vinyl acetate copolymer containing 5-20% by weight vinyl acetate), and 11% by weight Vitel 2200B (a product of Bostic identified as a polyester copolymer).

The following paint compositions are used to form a dry paint layer on the clear coat layer, one for Example 1 and the other for Example 2. The dry paint layer of Example 1 has a deep brown tone, while the dry paint layer of Example 2 has an orange pastel tone. In the following table, all numerical values are in parts by weight.

| Component | Example 1 | Example 2 |
|---|---|---|
| Methylethyl ketone | 66.7 | 66.7 |
| Toluene | 33.3 | 33.3 |
| VYHH (product of Union Carbide identified as a vinyl chloride/vinyl acetate copolymer) | 50.05 | 30.55 |
| Edenol 9790 (a product of Cognis identified as a polyester plasticizer) | 24.65 | 15.05 |
| Yellow pigment 42 (iron oxide) | 17.8 | 2.3 |

-continued

| Component | Example 1 | Example 2 |
|---|---|---|
| Orange pigment 36 (monoazo benzimidazoline) | 2.5 | 0.38 |
| Black 7 (carbon black) | 0.1 | 0.02 |
| White 6 (titanium dioxide) | 4.9 | 51.7 |

The pigment-to-binder volume ratio for Example 1 is 10%, and for Example 2 the ratio is 27%. The above paint formulations are applied to the clear coat layer using a reverse roll coater and are dried at a temperature of 135° C. to drive off the solvents. The dry film thickness of each of the dry paint layers is 0.7 mil.

A pigmented pressure sensitive adhesive is then applied to the dry paint layer at a coat weight of 14-20 gsm using transfer lamination to provide an adhesive layer corresponding to pressure sensitive adhesive layer 120. The adhesive is an ethyl hexyl acrylate based PSA available from Avery Dennison Corporation under product no. S-692N and the formulation for the pressure sensitive adhesive is as follows: 70-90% by weight 2-ethyl hexyl acrylate, 1-10% by weight acrylic acid, 10-20% by weight methyl acrylate, 3.7% UCD 1106E (a product of Rohm and -Haas identified as a titanium dioxide dispersion concentrate), and 0.3% by weight of UCD 1507E (a product of Rohm and Haas identified as a carbon black dispersion concentrate).

EXAMPLE 3

The procedure used for Examples 1 and 2 is repeated except that the following liquid paint composition is used to form the dry paint layer. In the following table, all numerical values are in parts by weight.

| Component | Parts |
|---|---|
| Methylethyl ketone | 29.6 |
| Toluene | 19.5 |
| Vitel 2200 B | 11.6 |
| Vitel 2650 (product of Bostic identified as a polyester copolymer) | 11.5 |
| R-900 (product of DuPont identified as titanium dioxide) | 27.5 |
| 955-39230 (product of Gibraltar Chemical Works identified as shading black) | 0.2 |
| 99-34520 (product of Gibraltar Chemical Works identified as phthalo blue GS) | 0.1 |
| 955-37470 (product of Gibraltar Chemical works identified as carbazole violet) | tint |

The foregoing paint composition has a light blue color. The dry film thickness of the dry paint film layer is 0.6-0.8 mil.

EXAMPLE 4

A PET release liner is coated on one side with a silicone release coating corresponding to the adhesive release coat layer. The thickness of the release coated liner is 0.92 mil.

A matte release coat layer is applied to the other side of the release liner using gravure at a coat weight of 4.4-4.6 gsm. The formulation for the matte release coat is as follows: 50.54 parts by weight methylisobutyl ketone, 7.84 parts by weight isopropanol, 8.93 parts by weight Lankyd 13-1425, 10.68 parts by weight VAGH (product of Union Carbide identified as hydroxy modified polyvinyl chloride/polyvinyl acetate copolymer), 22 parts by weight Microtalc MP 15-38, 2 parts by weight Cycat 4040, and 6.8 parts by weight Cymel 303. The matte release coat is dried using forced hot air at a temperature of 149° C.

A first coat of a transparent outer clear coat layer is applied to the matte release coat using gravure at a coat weight of 1.3-2 gsm and dried using forced hot air at a temperature of 120° C. The dry film thickness is 0.05-0.1 mil. The formulation for this first clear coat layer is as follows: 41.5% by weight methyl ethyl ketone, 41.5% by weight methyl isobutyl ketone, and 17% by weight Elvacite 2042 (a product of Lucite International identified as a polymethyl methacrylate).

A second coat of a clear coat layer is applied over the first transparent layer using gravure at a coat weight of 1.0-1.5 gsm and dried using forced hot air at a temperature of 120° C. The dry film thickness is 0.03-0.1 mil. The formulation for this second transparent film layer coat is as follows: 41.5% by weight methyl ethyl ketone, 41.5% by weight methyl isobutyl ketone, and 17% by weight VYHH (a product of Union Carbide identified as a vinyl chloride/vinyl acetate copolymer containing 5-20% by weight vinyl acetate).

A decorative print layer is printed over the second transparent clear coat layer at a coat weight of 3.0-3.2 gsm and dried in hot air at a temperature of 120° C. The paint composition for this decorative print layer has the following formulation (all numerical values are in parts by weight):

| Component | Parts |
|---|---|
| Methylethyl ketone | 42.6 |
| Methyl isobutyl ketone | 38.7 |
| VYHH | 15.86 |
| DP 80110 (product of Gibraltar Chemical Works identified as containing methylethyl ketone, toluene, carbon black and acrylic polymer) | 2.1 |
| DP 36640 (product of Gibraltar Chemical Works identified as containing methyl ethyl ketone, toluene, quinacridone red, and acrylic polymer) | 0.22 |
| I8977 (product of Gibraltar Chemical Works identified as containing methyl ethyl ketone, toluene, R.S. Phthalo Blue, and acrylic polymer) | 0.10 |
| I8980 (product of Gibraltar Chemical Works identified as containing methyl ethyl ketone, toluene, isoindolinone yellow and acrylic polymer) | 0.38 |

An additional decorative print layer is printed over the previous decorative print layer at a coat weight of 0.8 gsm and dried in hot air at a temperature of 120° C. The paint composition used for this decorative print layer has the following formulation (all numerical values are in parts by weight):

| Component | Parts |
|---|---|
| Methylethyl ketone | 42.85 |
| Methyl isobutyl ketone | 39.1 |
| VYHH | 16.0 |
| DP 80110 | 1.71 |
| DP 36640 | 0.18 |
| I8977 | 0.18 |

The following paint composition is coated over the two dried print coat layers at a coat weight of 30-32 gsm and dried in hot air at a temperature of 120° C. to provide a dry paint. In the following table, all numerical values are in parts by weight.

| Component | Parts |
| --- | --- |
| Methyl ethyl ketone | 34 |
| Toluene | 16.7 |
| VYHH | 18.3 |
| Edenol 9790 | 9 |
| AVI-0301-3 Orange (product of Gibraltar Chemical Works identified as containing methyl ethyl ketone, toluene, diarylide orange, VYHH and Edenol 9790) | 8.9 |
| AVI-0301-5 Magenta (product of Gibraltar Chemical Works identified as containing methyl ethyl ketone, toluene, Metal Azo Red, VYHH and Edenol 9790) | 5.3 |
| AVI-0301-6 Iron Red (product of Gibraltar Chemical Works identified as containing methyl ethyl ketone, toluene, Iron Oxide Red, VYHH and Edenol 9790) | 3.7 |
| AVI-0301-1 $TiO_2$ White (product of Gibraltar Chemical Works identified as containing methyl ethyl ketone, toluene, titanium dioxide, VYHH and Edenol 9790) | 3.52 |
| AVI-0301-2 Carbon Black (product of Gibraltar Chemical Works identified as containing methyl ethyl ketone, toluene, carbon black, VYHH and Edenol 9790) | 0.03 |

A pigmented pressure sensitive adhesive is then applied over the dry paint layer at a coat weight of 17 gsm using transfer lamination to provide an adhesive layer corresponding to pressure sensitive adhesive layer. The formulation for the pressure sensitive adhesive is as follows: 96% by weight of a non-tackified acrylic emulsion containing a crosslinked copolymer of butyl acrylate and 2-ethyl hexyl acrylate, 3.7% by weight UCD 1106E, and 0.3% by weight UCD 1507E.

EXAMPLE 5

A PET release liner is coated on one side with a silicone release coating. The thickness of the release coated liner is 0.92 mil.

A matte release coat is applied to the other side of the release liner using gravure at a coat weight of 4.4-4.6 gsm. The matte release coat is dried using forced hot air at a temperature of 149° C. The formulation for the matte release coat is as follows (all numerical values are in parts by weight):

| Component | Parts |
| --- | --- |
| Methyl isobutyl ketone | 52.54 |
| Elvacite 4402 (product of Lucite International identified as hydroxy ethyl methacrylate modified acrylic resin) | 20.98 |
| VYNS | 1.35 |
| Microtalc 15-38 | 22.85 |
| Byk 451 (product supplied by Byk Chemie identified as blocked acid catalyst) | 2.2 |
| Cymel 303 | 6.38 |

A transparent clear coat layer is applied to the matte release coat using a reverse roll coater at a coat weight of 13 gsm and dried using forced hot air at a temperature of 120° C. The dry film thickness is 0.4 mil. The formulation for the transparent clear coat layer is as follows (all numerical values are in parts by weight):

| Component | Parts |
| --- | --- |
| Rucothane CO-A-5002L (product of Ruco Chemical identified as polyester urethane) | 62.5 |
| Toluene | 18.75 |
| Isopropanol | 18.75 |

A decorative print layer is printed over the above indicated transparent film layer at a coat weight of 1 gsm and dried in hot air at a temperature of 120 ° C. The paint composition used for this decorative layer has the following formulation (all numerical values are in parts by weight):

| Component | Parts |
| --- | --- |
| Methyl ethyl ketone | 25.67 |
| Methyl isobutyl ketone | 22.0 |
| VYHH | 9.17 |
| I8980 | 3.5 |
| DP 37251 (product of Gibraltar Chemical Works identified as containing perylene red, methyl ethyl ketone, toluene and acrylic polymer) | 0.99 |
| DP80110 | 1.0 |
| DP39600 (product of Gibraltar Chemical Works identified as containing $TiO_2$, methyl ethyl ketone, toluene and acrylic polymer) | 37.47 |
| I8977 | 0.20 |

The following paint composition is coated over the decorative print layer at a coat weight of 66 gsm and dried in hot air at a temperature of 138° C. to form a dry paint layer. In the following table, all numerical values are in parts by weight:

| Component | Parts |
| --- | --- |
| Methyl isobutyl ketone | 24.11 |
| Toluene | 20.65 |
| VYHH | 11.54 |
| R-900 | 38.4 |
| Acryloid B-72 (product of Rohm and Haas identified as an acrylic resin) | 3.86 |
| I8980 | 2.6 |
| DP37251 | 0.21 |
| DP80110 | 0.40 |

A pressure sensitive adhesive is then applied over the dry paint layer at a coat weight of 15-20 gsm using transfer lamination to provide an adhesive layer. The pressure sensitive adhesive is a non-tackified acrylic emulsion. The formulation for the pressure sensitive adhesive is as follows: 70-90% by weight 2-ethyl hexyl acrylate, 1-10% by weight acrylic acid, and 10-20% by weight methyl acrylate.

EXAMPLE 6

A PET release liner is coated on one side with a silicone release coating. The thickness of the release coated liner is 0.92 mil.

A matte release coat is applied to the other side of the release liner using gravure. The release coat is dried using forced hot air at a temperature of 148.9° C. The matte release coat is applied at a coat weight of 4.0-5.0 gsm. The formulation for the matte release coat is as follows (all numerical values are in parts by weight):

| Component | Parts |
| --- | --- |
| Methyl isobutyl ketone | 42.03 |
| Isopropanol | 8.51 |
| Microtalc 15-38 | 23.87 |
| Cymel 303 | 7.36 |
| Cycat 4040 | 1.8 |
| VROH (product supplied by Union Carbide identified as a vinyl chloride/vinyl acetate copolymer with OH functionality) | 16.43 |

A transparent clear coat layer is applied over the matte release coat using a 2 mil byrd bar at a coat weight of 30 gsm and dried using hot air at a temperature of 126.7° C. The formulation for the transparent film layer is as follows (all numerical values are in parts by weight):

| Component | Parts |
| --- | --- |
| Water | 7.98 |
| N-methyl pyrrolidone | 4.79 |
| Texanol (product of Eastman Chemicals identified as an ester alcohol) | 4.79 |
| BYK 333 (product of Byk Chemie identified as a wetting agent) | 0.4 |
| Vycar 351 (product of Noveon identified as a polyvinyl chloride copolymer emulsion) | 79.81 |
| Antifoam PD-218 (product of Magrabar Chemical identified as an antifoam agent) | 0.32 |
| Rheolate 350 (product of Rheox, Inc. identified as a thickener) | 1.92 |

The following paint composition is coated over the transparent clear coat film at a coat weight of 96 gsm and dried in hot air at a temperature of 126.7° C. to form a dry paint film layer. In the following table, all numerical values are in parts by weight:

| Component | Parts |
| --- | --- |
| Water | 18.28 |
| Surfynol CT-324 (product of Air Products identified as a surfactant) | 0.98 |
| R-900 | 32.88 |
| Vycar 460X45 (product of Noveon identified as a vinyl chloride/acrylic copolymer) | 34.72 |
| Vycar 460X46 (product of Noveon identified as a vinyl chloride/acrylic copolymer) | 11.57 |
| Antifoam PD-218 | 0.19 |
| Byk 333 | 0.23 |
| Rheolate 350 | 1.2 |

A pressure sensitive adhesive layer is then applied over the dry paint layer at a coat weight of 17 gsm using transfer lamination to provide an adhesive layer corresponding to pressure sensitive adhesive layer. The formulation for the pressure sensitive adhesive is as follows: 96% by weight of a non-tackified emulsion containing a crosslinked copolymer of butyl acrylate and 2-ethyl hexyl acrylate, 3.7% by weight UCD 1106E, and 0.3% by weight UCD 1507E.

EXAMPLE 7

A PET release liner is coated on one side with a silicone release coat layer. The thickness of the release coated liner is 0.92 mil.

A matte release coat is applied to the other side of the release liner using gravure at a coat weight of 4.4-4.6 gsm. The formulation for the matte release coat is as follows: 50.54 parts by weight methyl isobutyl ketone, 7.84 parts by weight isopropanol, 8.93 parts by weight Lankyd 13-1425, 10.68 parts by weight VAGH (product of Union Carbide identified as hydroxy modified polyvinyl chloride/polyvinyl acetate copolymer), 22 parts by weight Microtalc MP 15-38, 2 parts by weight Cycat 4040, and 6.8 parts by weight Cymel 303. The matte release coat is dried using forced hot air at a temperature of 149° C.

A transparent clear coat layer is applied to the matte release coat using gravure at a coat weight of 12-16 gsm and dried using forced hot air at a temperature of 165° C. The dry film thickness is 0.35-0.5 mil. The formulation for this transparent film layer is as follows (all-numerical values are in parts by weight):

| Component | Parts |
| --- | --- |
| Cyclohexanone | 69.3 |
| Elvacite 2042 | 10.5 |
| Solsperse 17000 (product of Avecia identified as a wetting agent) | 0.1 |
| Tinuvin 234 (product of Ciba identified as a light stabilizer) | 0.6 |
| Kynar 301F (product of Atofina identified as a polyvinyl fluoride homopolymer) | 27.0 |
| N-methyl-2-pyrrolidone | 2.5 |

A decorative print layer is printed over the transparent coating layer at a coat weight of 0.3-1.2 gsm and dried in hot air at a temperature of 105° C. The paint composition used for this decorative layer has the following formulation (all numerical values are in parts by weight):

| Component | Parts |
| --- | --- |
| Methylethyl ketone | 36.0 |
| Methyl propyl ketone | 35.1 |
| Kynar 7201 (SL) (product of Atofina identified as a polyvinyl fluoride copolymer) | 10.2 |
| Elvacite 2010 (product of Lucite International identified as a polymethyl methacrylate) | 3.4 |
| Tinuvin 234 | 0.27 |
| DP35740 (product of Gibraltar Chemical Works identified as a buff mixed metal oxide pigment concentrate) | 0.10 |
| DP35820 (product of Gibraltar Chemical Works identified as a brown mixed metal oxide pigment concentrate) | 11.7 |
| DP39040 (product of Gibraltar Chemical Works identified as a black mixed metal oxide pigment concentrate) | 3.3 |

An additional decorative print layer is printed over the previous printed decorative layer at a coat weight of 0.3-1.2 gsm and dried in hot air at a temperature of 105° C. The paint composition used for this decorative print layer has the following formulation (all numerical values are in parts by weight):

| Component | Parts |
| --- | --- |
| Methylethyl ketone | 34.0 |
| Methyl propyl ketone | 33.0 |
| Kynar 7201 (SL) | 9.6 |
| Elvacite 2010 | 3.2 |
| Tinuvin 234 | 0.25 |
| DP35740 | 14.4 |
| DP35820 | 5.0 |
| DP39040 | 3.2 |

The following paint composition is coated over the decorative print layers at a coat weight of 6-10 gsm and dried in hot air at a temperature of 105° C. to provide a dry paint film layer corresponding to dry paint film layer 110. In the following table, all numerical values are in parts by weight.

| Component | Parts |
| --- | --- |
| Methyl ethyl ketone | 27.6 |
| Methyl propyl ketone | 26.3 |
| Kynar 7201 (SL) | 7.4 |
| Elvacite 2010 | 2.5 |
| Tinuvin 234 | 0.2 |
| DP35740 | 4.1 |
| DP35820 | 7.8 |
| DP39040 | 0.6 |
| DP39600 (product of Gibraltar Chemical Works identified as a white titanium dioxide pigment concentrate) | 23.6 |

A pigmented pressure sensitive adhesive is then applied over the dry paint layer at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

EXAMPLE 8

A PET release liner is coated on one side with a silicone release coating corresponding to the adhesive release coat layer. The thickness of the release coated liner is 0.92 mil.

A matte release coat is applied to the other side of the release liner using gravure at a coat weight of 4.4-4.6 gsm. The formulation for the matte release coat is as follows: 50.54 parts by weight methylisobutyl ketone, 7.84 parts by weight isopropanol, 8.93 parts by weight Lankyd 13-1425, 10.68 parts by weight VAGH (product of Union Carbide identified as hydroxy modified polyvinyl chloride/polyvinyl acetate copolymer), 22 parts by weight Microtalc MP 15-38, 2 parts by weight Cycat 4040, and 6.8 parts by weight Cymel 303. The matte release coat is dried using forced hot air at a temperature of 149° C.

A decorative print layer is printed over the matte release coat at a coat weight of 0.3-1.2 gsm and dried in hot air at a temperature of 105° C. The paint composition used for this decorative layer has the following formulation (all numerical values are in parts by weight):

| Component | Parts |
| --- | --- |
| Methylethyl ketone | 36.0 |
| Methyl propyl ketone | 35.1 |
| Kynar 7201 (SL) (product of Atofina identified as a polyvinyl fluoride copolymer) | 10.2 |
| Elvacite 2010 (product of Lucite International identified as a polymethyl methacrylate) | 3.4 |
| Tinuvin 234 | 0.27 |
| DP35740 (product of Gibraltar Chemical Works identified as a buff mixed metal oxide pigment concentrate) | 0.10 |
| DP35820 (product of Gibraltar Chemical Works identified as a brown mixed metal oxide pigment concentrate) | 11.7 |
| DP39040 (product of Gibraltar. Chemical Works identified as a black mixed metal oxide pigment concentrate) | 3.3 |

An additional decorative print layer is printed over the previous printed decorative layer at a coat weight of 0.3-1.2 gsm and dried in hot air at a temperature of 105° C. The paint composition used for this decorative print layer has the following formulation (all numerical values are in parts by weight):

| Component | Parts |
| --- | --- |
| Methylethyl ketone | 34.0 |
| Methyl propyl ketone | 33.0 |
| Kynar 7201 (SL) | 9.6 |
| Elvacite 2010 | 3.2 |
| Tinuvin 234 | 0.25 |
| DP35740 | 14.4 |
| DP35820 | 5.0 |
| DP39040 | 3.2 |

The following paint composition is coated using rotogravure over the decorative print layers at a coat weight of 5-16 gsm and dried in hot air at a temperature of 105° C. to form a dry paint layer. In the following table, all numerical values are in parts by weight.

| Component | Parts |
| --- | --- |
| Toluene | 19.0 |
| Methyl ethyl ketone | 23.6 |
| VYHH | 5.8 |
| Edenol 9790 | 2.9 |
| DV39600 (product of Gibraltar Chemical identified as iron oxide red pigment dispersion) | 48.6 |
| DV39420 (product of Gibraltar Chemical identified as carbon black pigment dispersion) | 0.07 |
| DV36500 (product of Gibraltar Chemical identified as Pigment Red 178 pigment dispersion) | 0.03 |
| DV34130 (product of Gibraltar Chemical identified as Phtalo Blue RS pigment dispersion) | 0.10 |

The following coating composition is coated over the dry paint layer using roll coating at a coat weight of 20-30 gsm and dried in hot air at a temperature of 105° C. to form a support or reinforcing layer. In the following table, all numerical values are in parts by weight:

| Component | Parts |
|---|---|
| Toluene | 14.1 |
| Methyl ethyl ketone | 21.1 |
| VYHH | 13.2 |
| Edenol 9790 | 6.6 |
| DV39600 | 44.96 |

A pigmented pressure sensitive adhesive is then applied over the coated layer corresponding to support layer 180 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and 2-ethyl hexyl acrylate, 3.7% by weight UCD 1106E, and 0.3% by weight UCD 1507E.

EXAMPLE 9

Figure 10:
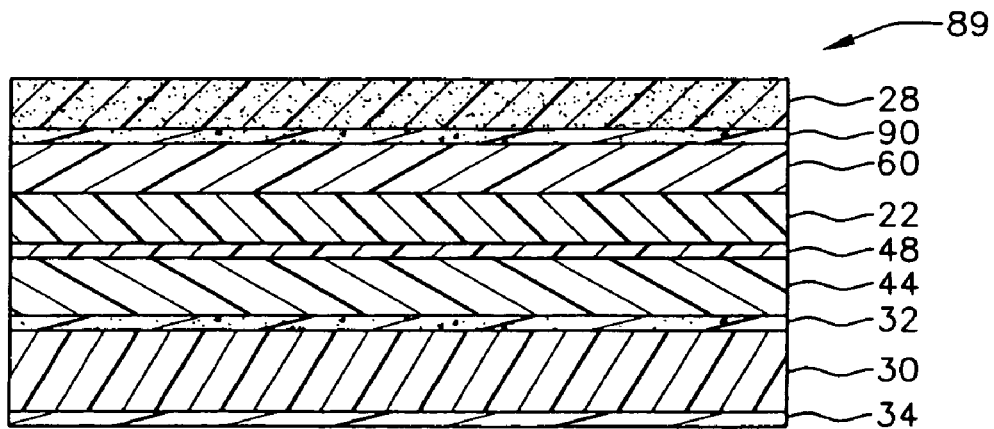
FIG. 10 is a schematic view illustrating one embodiment of the invention which includes a dry paint layer, a barrier layer and a tie coat for the adhesive layer.

FIG. 10 illustrates one embodiment of the invention in which a decorative laminate 89 includes a dry paint layer coated in sequence onto a release liner 30 which includes a matte release coat 32 on one side and an adhesive release layer 34 on the side opposite the dry paint layer. The dry paint layer comprises an outer clear coat layer 44, one or more decorative print coats 48, and a color layer 22. A barrier layer 60 is bonded to the color layer and a tie coat 90 is bonded to the barrier coat and the PSA layer 28.

A PET liner is coated on one side with a silicone release coating corresponding to the adhesive release coat layer. The thickness of the silicone coated liner is 0.92 mil and comprises Mitsubishi 92 gauge SLK.

The matte release coat is applied to the other side of the release liner using gravure at a coat weight of 4.5 to 5.5 gsm. The formulation for the matte release coat is as follows (with all numerical values in parts by weight):

| Component | Parts |
|---|---|
| Methyl isobutyl ketone (MiBK) | 53.47 |
| Isopropanol | 6.49 |
| Lankyd 13-1245 (product of Akzo Chemical, identified as an acrylic modified alkyd) | 7.21 |
| VAGH | 8.72 |
| EFKA 5055 (a carboxylic acid ester dispersing agent) | 1.10 |
| Microtalc MP 15-38 | 23.02 |
| Cymel 303 (Cytec melamine resin) | 7.45 |
| Byk 451 (Byk Chemie blocked acid catalyst) | 3.50 |

In preparing the release coat material the base materials (VAGH, alkyd and talc) are compounded in a 100 part formula. The Cymel 303 and Byk 451 are later blended and after the materials are delivered to the coater the two solutions are blended together. The matte release coat is dried using forced air at a temperature of 149° C.

The matte release coat comprises as its crosslinking resin the melamine (hexamethoxy methyl) resin Cymel 303. The hydroxyl modified polyvinyl chloride/polyvinyl acetate copolymers (VAGH) comprise the primary functional resin and the acrylic modified alkyd comprises a secondary functional resin. The primary cross-linking resin controls crosslinking and bonds to the polyester carrier film. The secondary functional resin modifies release of the dry paint layer (top coat) from the matte release coat. The blocked acid catalyst accelerates the crosslinking process and the filler particles, talc, control the degree of microroughness of the dry matte release coat.

A transparent clear coat layer is applied to the matte release coat using gravure at a coat weight of 2.6 to 3.0 gsm and dried using forced hot air at a temperature of 165° C. The dry film thickness is 0.09-0.10 mil. The clear coat consists essentially of a thermoplastic acrylic resinous material, preferably polymethyl methacrylate. The formulation for the transparent top coat layer (with all numerical values in parts by weight) is as follows:

| Component | Parts |
|---|---|
| MEK | 40 |
| MiBK | 41 |
| Elvacite 2042 | 19 |

One or more decorative print coats having printing ink formulations similar to those described in previous examples are next printed over the transparent top coat layer following procedures as described previously.

The following paint coat composition is coated over the decorative print layers using roll coating at a coat weight of 33.0 to 36.0 gsm and dried in hot air at a temperature of 105° C. to form a color coat layer. The dry film thickness is 0.65 to 0.73 mil. In the following table all numerical values are in parts by weight:

| Component | Parts |
|---|---|
| NiPar 820 (product of Angus Chemical identified as a blend of 80% nitro propane and 20% nitro ethane) | 15.98 |
| Xylene | 23.95 |
| Cyclohexanone | 7.71 |
| VYHH | 12.76 |
| Edenol 9790 | 6.38 |
| Stanclere T-883 (product of Adchross Chemical identified as a tin heat stabilizer) | 0.06 |
| EPON 828 (epoxy resin product of Shell) | 0.26 |
| DV 39600 (Gibraltar $TiO_2$ white pigment dispersion) | 32.12 |
| DV 396420 (Gibraltar carbon black pigment dispersion) | 0.23 |
| DV 36500 (Gibraltar red pigment dispersion) | 0.16 |
| DV 34130 (Gibraltar phthalo blue pigment dispersion) | 0.39 |

The following barrier coat layer is coated over the dried color coat layer at a coat weight of 1.5 to 2.0 gsm. All numerical values are in parts by weight:

| Component | Parts |
|---|---|
| AdCoat 61WG178 (a product of Rohm and Haas identified as acrylic polymer) | 45 |
| Isopropanol | 52 |
| Cymel 303 (Cytec melamine resin) | 2.4 |
| Cycat 4040 (Cytec paratoluene sulfonic acid) | 0.2 |

The barrier layer comprises a crosslinked acrylic resinous material which is applied by gravure and dried, using forced air at a temperature of 149° C. The dry film thickness of the barrier layer is 0.05 to 0.07 mil.

The barrier layer provides a means for inhibiting or preventing migration of discoloration-causing pigments into the color-producing layers of the laminate.

The following tie coat is coated over the dried barrier layer. All numerical values are in parts by weight:

| Component | Parts |
|---|---|
| MEK | 25.24 |
| MiBK | 25.59 |
| VYHH | 8.98 |
| Edenol 9790 plasticizer | 4.49 |
| Stanclere T-883 | 0.04 |
| EPON 828 | 0.18 |
| DV 39600 | 35.03 |
| DV 39420 | 0.45 |

The tie coat is coated at a coat weight of 2.8 to 3.3 gsm and with a dry film thickness from about 0.05 to 0.06 mil. The tie coat enhances adhesion between the barrier layer and the pressure sensitive adhesive layer. The tie coat is a variation of the color coat. In the present system, the barrier layer adheres to the color coat and the PSA adheres well to a similar color coat; so the tie coat is selected for its ability to provide good adhesion between the color coat and the PSA. The pigment component of the tie coat hardens the binder to a useful level.

The dry film thickness of the decorative laminate of this Example is within a preferred range of 1.30 to 1.60 mil. In the described example, the dry film thickness of the combined top coat, color coat, barrier coat, tie coat and PSA is from 1.35 to 1.51 mil.

A pigmented pressure sensitive adhesive layer is then applied to a carrier at a coat weight of 13 to 16 gsm. The dry film thickness of the PSA is from about 0.45 to 0.55 mil. The PSA is then applied to the tie coat by transfer lamination. The PSA is available from Avery Dennison Corporation under product no. S-3526 and the formulation for the PSA is as follows (with numerical values in parts by weight):

| Component | Parts |
|---|---|
| S-3506 (product of Avery Dennison, Performance Polymers, identified as a crosslinked copolymer emulsion of butyl acrylate and 2-ethyl hexyl acrylate) | 96.0 |
| UCD 110GE (white TiO$_2$ pigment dispersion from Rohm and Haas) | 3.7 |
| UCD 1507E (carbon black pigment dispersion from Rohm and Haas) | 0.3 |

EXAMPLE 10

Gloss measurements taken on the Byk-Mallinckrodt gloss meter for various paint films as described herein produced the following gloss readings:

(1) Release coat—Elvacite 2899/VYNS at a ratio of 14.5:1, having a standard range of microtalc at 1.0 to 1.1:1 talc to polymer with Cymel 303
Top coat—none
Color coat—Rohm and Haas Acryloid B72/VYHH at a ratio of 1:3
   Gloss at 60°—3.4
   Gloss at 85°—8.8

(2) Release coat—Elvacite 2899/VYNS at a ratio of 14.5:1, having a standard range of microtalc at 1.0 to 1.1:1 talc to polymer with Cymel 303
Top coat—Rucothane CO A 5002L urethane polymer
Color coat—Rohm and Haas B72/VYHH at a ratio of 1:3
   Gloss at 60°—4.9
   Gloss at 85°—8.5

(3) Film having faux leather finish:
Release coat—Acrylic modified alkyd with Cymel 303 and standard range of microtalc at 1.0 to 1.1:1 talc to polymer.
Top coat—Elvacite 2042 and VYHH/Vitel 220B at 1:1 ratio.
   Gloss at 60°—2.2
   Gloss at 85°—32.4

(4) Films having release coats and transparent top coat layers prepared according to Examples 7 and 9 produced gloss readings within a range from about 26 to about 30 at 85°.

EXAMPLE 11

To measure the "force differential" in terms of carrier release force versus unwind release force, samples were produced in two-inch-wide by 12-inch long strips to simulate unwinding of a roll of the decorative film. A construction under test comprised the FIG. 3 embodiment having a transparent top coat, pigmented color layer, a PSA layer with the PSA side of the film exposed, and a release liner comprising a PET film having a matte release coat in contact with the top coat and an exposed silicone release coat on the opposite side of the release liner. In other tests, the construction was similar to that shown in FIG. 10 in which the same construction included the barrier layer and the tie coat layer.

One comparative test used test samples in which the compositions of the transparent top coat, the color coat and the PSA layer were generally as described in Examples 7 and 9, which included the Avery Dennison S-3506 PSA layer (an unpigmented form of Avery S-3526 adhesive). In other test samples, color coat and top coat formulations similar to Example 1 were used, in combination with the Avery S-3506 PSA layer. In further test samples, a construction involved the top coat and color coat formulations of Example 1 along with a different Avery Dennison PSA identified as S-692 N adhesive.

The tests involved peeling the matte release layer away from the dry paint layer and peeling the silicone side of the release liner away from the PSA part of the sample. The tests were conducted at room temperature. In one test, separate adhesive tapes were attached to the sides of the test samples to test the peel force at each interface with each tape extending in opposite directions, each at a 90° angle to the sample. The tests were performed on a movable sled having adjustable peel rates which, in one embodiment, were varied in increments from speeds as low as 12 inches per minute up to 1200 inches per minute. Peel forces were measured at progressive speed intervals and plotted on comparative force-versus-peel rate profiles.

The test results showed that carrier release force is reasonably uniform across a broad range of release rates, whereas unwind release forces tend to stay below the carrier release force at low speeds, but they approach and ultimately exceed the carrier force at higher speeds. Each profile generated by the tests was characterized by a cross-over release rate at which the unwind release force reaches and exceeds the carrier release force. Generally speaking, the self wound rolls that produced the best unwind response maintained a carrier release force in excess of the unwind release force at rates up to about 100 inches per minute. The test results showed that unwind force for the S-692 N PSA approached carrier release force more rapidly than and exceeded it at a much lower propagation rate than the S-3506 PSA, which had superior unwind performance compared to the S-692 N PSA. Such superior unwind performance was characterized by self-wound rolls of film containing the S-3506 adhesive being unwound without premature release of the release liner from the dry paint layer; whereas rolls of film containing the S-692 N PSA experienced unreliable release response.

It was also observed that the S-3506 PSA exhibited lower tack levels and had less cold flow than the S-692 N PSA. This was attributed to the S-3506 PSA having an internally crosslinked structure which produced the lower tack levels and lower cold flow than the S-692N PSA which was not internally crosslinked and had higher tack levels, as well as higher cold flow. This difference in PSA properties caused the non-crosslinked PSA to stick more to the silicone side of the release liner and raised the unwind release force to levels that were too high and produced unreliable unwind response compared to the crosslinked PSA which produced more desirable (lower) unwind release force levels.

The present invention has been described with respect to multilayer laminates used as a wall film for interior architectural applications, but the laminate also is useful in other applications as well. These would include exterior architectural applications such as siding panels and wall surfaces; outdoor decorative items and signs; interior automotive decorative and functional uses such as dashboards and panels; and exterior automotive uses including automotive body parts, trim parts and panels.

What is claimed is:

1. A self-wound decorative dry paint transfer laminate comprising a layer of dry paint, a pressure-sensitive adhesive layer on one side of the dry paint layer adapted for room temperature adhesion to a substrate surface, and a release liner in releasable contact with the dry paint layer on a side opposite from the pressure-sensitive adhesive, one side of the release liner having bonded thereto a matte release coat layer that contacts the dry paint layer, the matte release coat layer releasably adhering to the dry paint layer but adapted to transfer a matte surface finish to the dry paint layer when the release liner is removed from the dry paint layer, the dry paint layer comprising a pigmented color coat layer and a transparent outer clear coat layer bonded to the color coat and in contact with the matte release coat layer on the release liner, the matte surface being transferred to the transparent outer clear coat layer, an opposite side of the release liner having an adhesive release coat layer that contacts the pressure-sensitive adhesive when the laminate is in a self-wound form, the adhesive release coat layer preferentially releasing the liner from the pressure-sensitive adhesive when the laminate is unwound while the liner maintains adhesion to the matte release coat layer, the pressure-sensitive adhesive comprising a crosslinked acrylic resinous material, the matte release coat layer having a micro-roughened surface for transferring a matte surface finish to the dry paint layer at room temperature with a surface gloss of less than about 35% at 85°.

2. The article according to claim 1 in which the transparent outer clear coat layer comprises an acrylic resinous material.

3. The article according to claim 1 in which the matte release coat comprises a thermoset resinous material containing a dispersed particulate material for forming the matte surface finish.

4. The article according to claim 1 in which the adhesive layer comprises a non-tackified acrylic emulsion.

5. The article according to claim 1 in which the release force between the adhesive layer and the release liner is less than the release force between the release liner and the dry paint layer.

6. The article according to claim 5 in which the transparent outer clear coat layer comprises an acrylic resinous material, the matte release coat comprises a thermoset resinous material containing a dispersed particulate material for forming the matte surface finish, and the adhesive layer comprises a non-tackified acrylic emulsion.

7. The article according to claim 1 in which the gloss level is from about 25% to about 30% at 85°.

8. A self-wound multi-layer laminate for applying a layer of color to a substrate surface, the laminate comprising:
a dry paint layer comprising a color layer which includes a binder and a pigment, the dry paint layer having an upper surface and a lower surface,
a pressure-sensitive adhesive layer overlying the upper surface of the dry paint layer and adapted for adhering the laminate to a substrate surface at room temperature;
a release liner overlying the lower surface of the dry paint layer, the release liner having a dry paint release coat releasably adhered to the lower surface of the dry paint layer, and an adhesive release coat layer on a side of the release liner opposite from the dry paint layer, the release liner and the dry paint release coat removable from the dry paint layer at room temperature,
the dry paint release coat transferring a controlled surface finish to an exposed surface of the dry paint layer when the pressure-sensitive adhesive layer adheres the laminate to the substrate surface under application of pressure and the release liner is peeled away from the dry paint layer,
the laminate adapted for being self-wound into a roll with the pressure-sensitive adhesive layer in contact with the adhesive release coat layer,
the adhesive release coat layer and the pressure-sensitive adhesive layer having an unwind release force between them which is lower than a carrier release force between the dry paint release coat and the dry paint layer, such that the adhesive release coat preferentially releases the liner from contact with the pressure-sensitive adhesive layer when unwinding the laminate from its roll form, while the dry paint release coat maintains contact with the dry paint layer when the laminate is being unwound from its roll form,
in which the pressure-sensitive adhesive is selected from the group consisting of a crosslinked acrylic resinous material, an internally crosslinked acrylic emulsion, and a crosslinked copolymer emulsion of butyl acrylate and ethyl hexyl acrylate.

9. The article according to claim 8 in which the adhesive is repositionable with a suppressed initial tack level that undergoes subsequent buildup of adhesion due to passage of time sufficient to permanently bond the dry paint layer to the substrate.

10. The article according to claim 8 in which the dry paint release coat comprises a crosslinked resinous material bonded to the release liner and having a surface that transfers a controlled surface gloss to the dry paint layer.

11. The article according to claim 8 in which the dry paint layer comprises a pigmented color coat layer and a transparent outer clear coat layer bonded to the color coat and in contact with the dry paint release coat layer on the release liner, the controlled surface gloss being transferred to the transparent outer clear coat layer.

12. The article according to claim 8 in which the transparent outer clear coat layer comprises an acrylic resinous material.

13. A self-wound multi-layer laminate for applying a layer of color to a substrate surface, the laminate comprising:
a dry paint layer comprising a color layer which includes a binder and a pigment, the dry paint layer having an upper surface and a lower surface,
a pressure-sensitive adhesive layer overlying the upper surface of the dry paint layer and adapted for adhering the laminate to a substrate surface at room temperature;
a release liner overlying the lower surface of the dry paint layer, the release liner having a matte release coat releasably adhered to the lower surface of the dry paint layer, and an adhesive release coat layer on a side of the release liner opposite from the dry paint layer, the release liner and the matte release coat removable from the dry paint layer at room temperature,
the matte release coat transferring a matte finish to an exposed surface of the dry paint layer when the pressure-sensitive adhesive layer adheres the laminate to the substrate surface under application of pressure and the release liner is peeled away from the dry paint layer,
the laminate adapted for being self-wound into a roll with the pressure-sensitive adhesive layer in contact with the adhesive release coat layer,
the adhesive release coat layer and the pressure-sensitive adhesive layer having an unwind release force between them which is lower than a carrier release force between the matte release coat and the dry paint layer, such that the adhesive release coat preferentially releases the liner from contact with the pressure-sensitive adhesive layer when unwinding the laminate from its roll form, while the matte release coat maintains contact with the dry paint layer when the laminate is being unwound from its roll form;
in which the pressure-sensitive adhesive is selected from the group consisting of a crosslinked acrylic resinous material, an internally crosslinked acrylic emulsion, and a crosslinked copolymer emulsion of butyl acrylate and ethyl hexyl acrylate.

14. The article according to claim 13, wherein an unwind force required to unwind the adhesive release coat layer from the adhesive layer is less than about 150 grams per two inches; wherein said laminate is unwound at a rate of about 300 inches per minute and wherein said laminate is unwound at an angle of about 90°.

15. The article according to claim 14, wherein said unwind force is less than about 100 grams per two inches.

16. The article according to claim 15, wherein said unwind force is from about 30 to about 70 grams per two inches.

17. The article according to claim 13, wherein a carrier release force between said matte release coat and said dry paint layer is from about 20 to about 180 grams per two inches; wherein said release liner is peeled from said dry paint layer at a rate of about 300 inches per minute and wherein said release liner is peeled from said dry paint layer at an angle of at least about 90 degrees.

18. The article according to claim 17, wherein said carrier release force is from about 30 to about 150 grams per two inches.

19. The article according to claim 18, wherein said carrier release force is from about 40 to about 120 grams per two inches.

20. The article according to claim 13 in which the level of gloss transferred from the matte release liner is less than about 35% at 85°.

21. The article according to claim 13 in which the matte release coat has a hardened state at room temperature and is made from a resinous material that contains (1) a surfacing component that forms a matte release surface, (2) an adhesion component for releasably adhering the matte release surface to the dry paint layer, and (3) a release component that releases the matte release surface from contact with the dry paint layer at room temperature to transfer the matte surface finish from the matte release surface to the exposed surface of the dry paint layer.

22. The article according to claim 13 in which the carrier release force is maintained at a level greater than the unwind release force for unwind release rates from about 6 to about 300 inches per minute for a 2 inch wide self-wound laminate.

23. The article according to claim 13 in which the carrier release force is maintained at a level within the range from about 45 to about 65 grams per two inches.

24. The article according to claim 23 in which the unwind release force is maintained at a level within the range from about 20 to about 40 grams per two inches over a range of liner release rates from about 12 to at least about 60 inches per minute.

25. The article according to claim 13 in which the adhesive is repositionable with a suppressed initial tack level that undergoes subsequent buildup of adhesion due to passage of time sufficient to permanently bond the dry paint layer to the substrate.

26. The article according to claim 13 in which the matte release coat comprises a crosslinked resinous material bonded to the release liner and having a micro-roughened surface that transfers the matte surface to the dry paint layer.

27. The article according to claim 26 in which the dry paint layer comprises a pigmented color coat layer and a transparent outer clear coat layer bonded to the color coat and in contact with the matte release coat layer on the release liner, the matte surface being transferred to the transparent outer clear coat layer.

28. The article according to claim 27 in which the transparent outer clear coat layer comprises an acrylic resinous material.

29. The article according to claim 28 in which the pressure-sensitive adhesive layer comprises a crosslinked acrylic resinous material.

30. The article according to claim 13 in which the dry paint layer comprises a pigmented color coat layer and a transparent outer clear coat layer bonded to the color coat and in contact with the matte release coat layer on the release liner, the matte surface being transferred to the transparent outer clear coat layer, and in which the transparent outer clear coat layer comprises an acrylic resinous material.

31. The article according to claim 13 in which the matte release coat comprises a thermoset resinous material containing a dispersed particulate material for transferring a low gloss surface to the dry paint layer.

32. The article according to claim 13 in which the matte release coat formulation comprises a resinous material substantially in the absence of a silicone release agent or a wax component.

33. The article according to claim 13 in which the carrier release force is in excess of the unwind release force for release force rates up to about 100 inches per minute.

34. A self-wound multi-layer laminate for applying a layer of color to a substrate surface, the laminate comprising:
a dry paint layer comprising a color layer which includes a binder and a pigment, the dry paint layer having an upper surface and a lower surface,
a pressure-sensitive adhesive layer overlying the upper surface of the dry paint layer and adapted for adhering the laminate to a substrate surface at room temperature, the pressure-sensitive adhesive comprising a crosslinked acrylic resinous material;
a release liner overlying the lower surface of the dry paint layer, the release liner having a dry paint release coat releasably adhered to the lower surface of the dry paint layer, and an adhesive release coat layer on a side of the release liner opposite from the dry paint layer, the release liner and the release coat removable from the dry paint layer at room temperature, the pressure-sensitive adhesive layer having a suppressed initial level of tack at room temperature that allows the laminate to adhere to the substrate surface and be repositioned thereon followed by removal of the release liner from the dry paint layer, the adhesive layer undergoing subsequent buildup of tack due to the passage of time sufficient to permanently bond the dry paint layer to the substrate;

the dry paint release coat transferring a controlled surface finish to an exposed surface of the dry paint layer when the pressure-sensitive adhesive layer adheres the laminate to the substrate surface under application of pressure and the release liner is peeled away from the dry paint layer, the laminate adapted for being self-wound into a roll with the pressure-sensitive adhesive layer in contact with the adhesive release coat layer, the adhesive release coat layer and the pressure-sensitive adhesive layer having an unwind release force between them which is lower than a carrier release force between the dry paint release coat and the dry paint layer, such that the adhesive release coat layer preferentially releases the liner from contact with the pressure-sensitive adhesive layer when unwinding the laminate from its roll form, while the dry paint release coat maintains contact with the dry paint layer when the laminate is being unwound from its roll form, in which said carrier release force is from about 30 to about 150 grams per two inches.

35. The article according to claim 34, wherein an unwind force required to unwind the adhesive release coat layer from the adhesive layer is less than about 150 grams per two inches; wherein said laminate is unwound at a rate of about 300 inches per minute and wherein said laminate is unwound at an angle of about 90°.

36. The article according to claim 34, wherein said unwind force is less than about 100 grams per two inches.

37. The article according to claim 34, wherein said unwind force is from about 30 to about 70 grams per two inches.

38. The article according to claim 34, wherein a carrier release force between said matte release coat and said dry paint layer is from about 20 to about 180 grams per two inches; wherein said release liner is peeled from said dry paint layer at a rate of about 300 inches per minute and wherein said release liner is peeled from said dry paint layer at an angle of at least about 90 degrees.

39. The article according to claim 34, wherein said carrier release force is from about 30 to about 150 grams per two inches.

40. A self-wound multi-layer laminate for applying a layer of color to a substrate surface, the laminate comprising:

a dry paint layer comprising a color layer which includes a binder and a pigment, the dry paint layer having an upper surface and a lower surface, a pressure-sensitive adhesive layer overlying the upper surface of the dry paint layer and adapted for adhering the laminate to a substrate surface at room temperature, the pressure-sensitive adhesive comprising a crosslinked acrylic resinous material;

a release liner overlying the lower surface of the dry paint layer, the release liner having a matte release coat releasably adhered to the lower surface of the dry paint layer, and an adhesive release coat layer on a side of the release liner opposite from the dry paint layer, the release liner and the release coat removable from the dry paint layer at room temperature, the pressure-sensitive adhesive layer having a suppressed initial level of tack at room temperature that allows the laminate to adhere to the substrate and be repositioned thereon followed by removal of the matte release liner from the dry paint layer, the adhesive layer undergoing subsequent buildup of tack due to the passage of time sufficient to permanently bond the dry paint layer to the substrate;

the matte release coat transferring a matte finish to an exposed surface of the dry paint layer when the pressure-sensitive adhesive layer adheres the laminate to the substrate surface under application of pressure and the release liner is peeled away from the dry paint layer, the laminate adapted for being self-wound into a roll with the pressure-sensitive adhesive layer in contact with the adhesive release coat layer, the adhesive release coat layer and the pressure-sensitive adhesive layer having an unwind release force between them which is lower than a carrier release force between the matte release coat and the dry paint layer, such that the adhesive release coat layer preferentially releases the liner from contact with the pressure-sensitive adhesive layer when unwinding the laminate from its roll form, while the matte release coat maintains contact with the dry paint layer when the laminate is being unwound from its roll form, in which said carrier release force is from about 30 to about 150 grams per two inches.

41. The article according to claim 40, wherein said carrier release force is from about 40 to about 120 grams per two inches.

42. The article according to claim 40 in which the level of gloss transferred from the matte release liner is less than about 35% at 85°.

43. The article according to claim 40 in which the carrier release force is maintained at a level greater than the unwind release force for unwind release rates from about 6 to about 300 inches per minute for a 2 inch wide self-wound laminate.

44. The article according to claim 40 in which the carrier release force is maintained at a level within the range from about 45 to about 65 grams per two inches.

45. The article according to claim 40 in which the matte release coat comprises a crosslinked resinous material bonded to the release liner and having a micro-roughened surface that transfers the matte surface to the dry paint layer.

46. The article according to claim 40 in which the pressure-sensitive adhesive comprises a crosslinked copolymer emulsion of butyl acrylate and ethyl hexyl acrylate.

47. The article according to claim 46 in which the acrylic resinous adhesive comprises an internal crosslinking agent.

48. The article according to claim 40 in which the matte release coat comprises a crosslinked resinous material bonded to the release liner and having a micro-roughened surface formed by a dispersed fine particulate material that transfers the matte surface to the dry paint layer.

* * * * *